(12) United States Patent
Lee et al.

(10) Patent No.: US 12,082,132 B2
(45) Date of Patent: Sep. 3, 2024

(54) METHOD AND DEVICE FOR PERFORMING SIDELINK SYNCHRONIZATION IN WIRELESS COMMUNICATION SYSTEM

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 559 days.

(21) Appl. No.: 17/433,515

(22) PCT Filed: Feb. 25, 2020

(86) PCT No.: PCT/KR2020/002697
§ 371 (c)(1),
(2) Date: Aug. 24, 2021

(87) PCT Pub. No.: WO2020/175891
PCT Pub. Date: Sep. 3, 2020

(65) Prior Publication Data
US 2022/0159590 A1 May 19, 2022

Related U.S. Application Data

(60) Provisional application No. 62/810,348, filed on Feb. 25, 2019, provisional application No. 62/828,458, filed on Apr. 2, 2019.

(51) Int. Cl.
*H04W 56/00* (2009.01)
*H04L 5/00* (2006.01)
*H04W 92/18* (2009.01)

(52) U.S. Cl.
CPC ......... *H04W 56/001* (2013.01); *H04L 5/0051* (2013.01); *H04W 92/18* (2013.01)

(58) Field of Classification Search
CPC .... H04W 56/001; H04W 92/18; H04L 5/0051
(Continued)

(56) References Cited

FOREIGN PATENT DOCUMENTS

| KR | 1020170093333 | 8/2017 |
| WO | 2017049521 | 3/2017 |
| WO | 2018062850 | 4/2018 |

OTHER PUBLICATIONS

Huawei et al., "Discussion of transmission parameters range of PSSCH," R1-167151, 3GPP TSG RAN WG1 Meeting #86, Gothenburg, Sweden, Aug. 12, 2018, see pp. 1-2, and figure 1.
(Continued)

*Primary Examiner* — Gbemileke J Onamuti
(74) *Attorney, Agent, or Firm* — BRYAN CAVE LEIGHTON PAISNER LLP

(57) ABSTRACT

Proposed is a method for performing wireless communication by a first device. The method can comprise steps in which the first device receives from a second device a first physical sidelink control channel (PSCCH) or a first physical sidelink shared channel (PSSCH) comprising information relating to a second synchronization source, determines synchronization of the second device on the basis of the information relating to the second synchronization source, and performs the synchronization of the second device on the basis of a reference signal of the first PSCCH or first PSSCH. For example, the second synchronization source can comprise a synchronization source having a highest priority configured beforehand with respect to the second device.

15 Claims, 24 Drawing Sheets

(58) Field of Classification Search
USPC .......................................................... 370/503
See application file for complete search history.

(56) References Cited

OTHER PUBLICATIONS

ETSI TS 136 523-1 V15.3.0, LTE; E-UTRA and EPC; UE conformance, specification; Part 1; Protocol conformance specification; 3GPP TS 36.523-1 V15.3.0, Oct. 2018, see p. 5432.

(a)

(b)

(a)

(b)

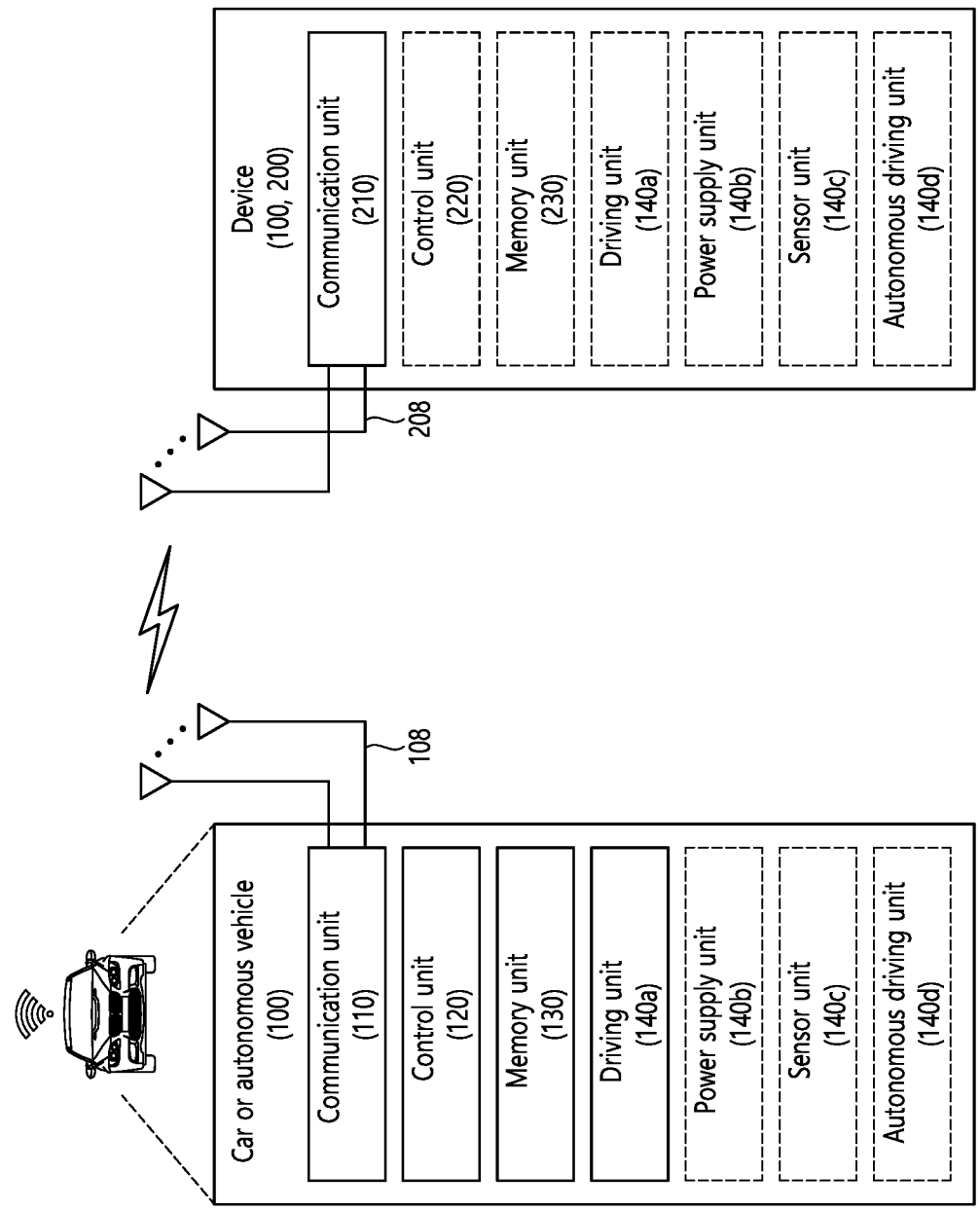

METHOD AND DEVICE FOR PERFORMING SIDELINK SYNCHRONIZATION IN WIRELESS COMMUNICATION SYSTEM

This application is the National Stage filing under 35 U.S.C. 371 of International Application No. PCT/KR2020/002697 filed on Feb. 25, 2020, which claims priority to U.S. Provisional Application Nos. 62/810,348 filed on Feb. 25, 2019 and 62/828,458 filed on Apr. 2, 2019, the contents of which are all hereby incorporated by reference herein in their entirety.

BACKGROUND

Field

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in a wireless communication system, the UE may derive/determine a time/frequency synchronization value related to a selected synchronization reference source according to a pre-defined rule. For example, if a synchronization quality related to the synchronization reference source is lower than a pre-determined threshold value, the UE may have to search for a completely asynchronous new synchronization reference source. However, a procedure for searching for a completely asynchronous new synchronization reference source and/or a procedure for deriving/determining a synchronization value for the new synchronization reference source may require a high level of complexity.

Therefore, there is a need to propose a method for the UE to perform synchronization based on a reference signal from another UE.

Technical Solutions

In an embodiment, there is provided a method of performing wireless communication by a first apparatus 100. The method may include receiving a first physical sidelink control channel (PSCCH) or a first physical sidelink shared channel (PSSCH) including information related to a second synchronization source from a second device, and determining synchronization with the second device based on the information related to the second synchronization source, and performing synchronization with the second device based on a reference signal on the first PSCCH or the first PSSCH. For example, the second synchronization source includes a synchronization source having a highest priority pre-configured for the second device.

Effects of the Disclosure

A UE may effectively perform sidelink communication.

BRIEF DESCRIPTION OF THE DRAWINGS

FIG. 24 shows a car or an autonomous vehicle, in accordance with an embodiment of the present disclosure.

Figure 1:
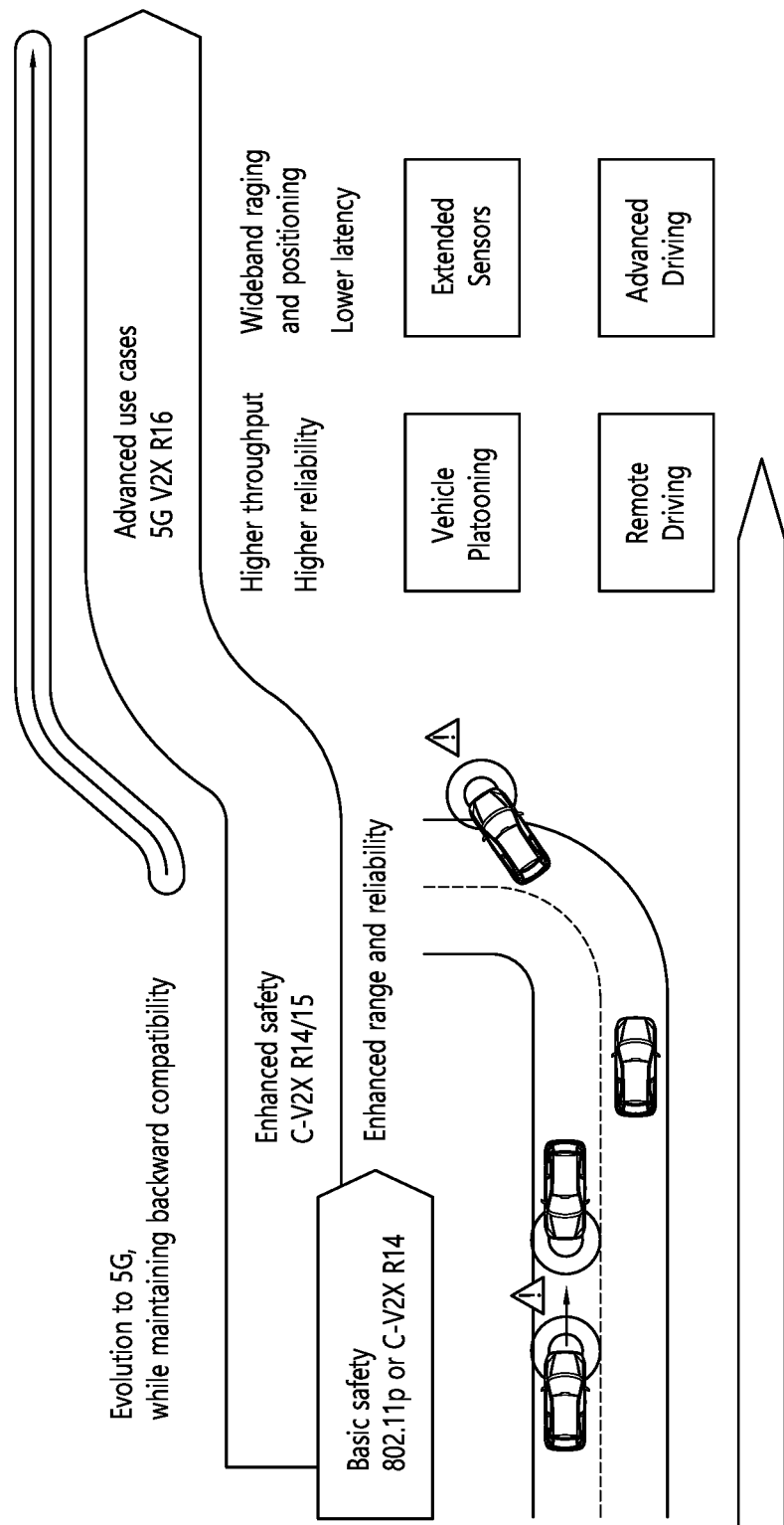
FIG. 1 is a drawing for describing V2X communication based on NR, compared to V2X communication based on RAT used before NR.

DESCRIPTION OF EXEMPLARY EMBODIMENTS e present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
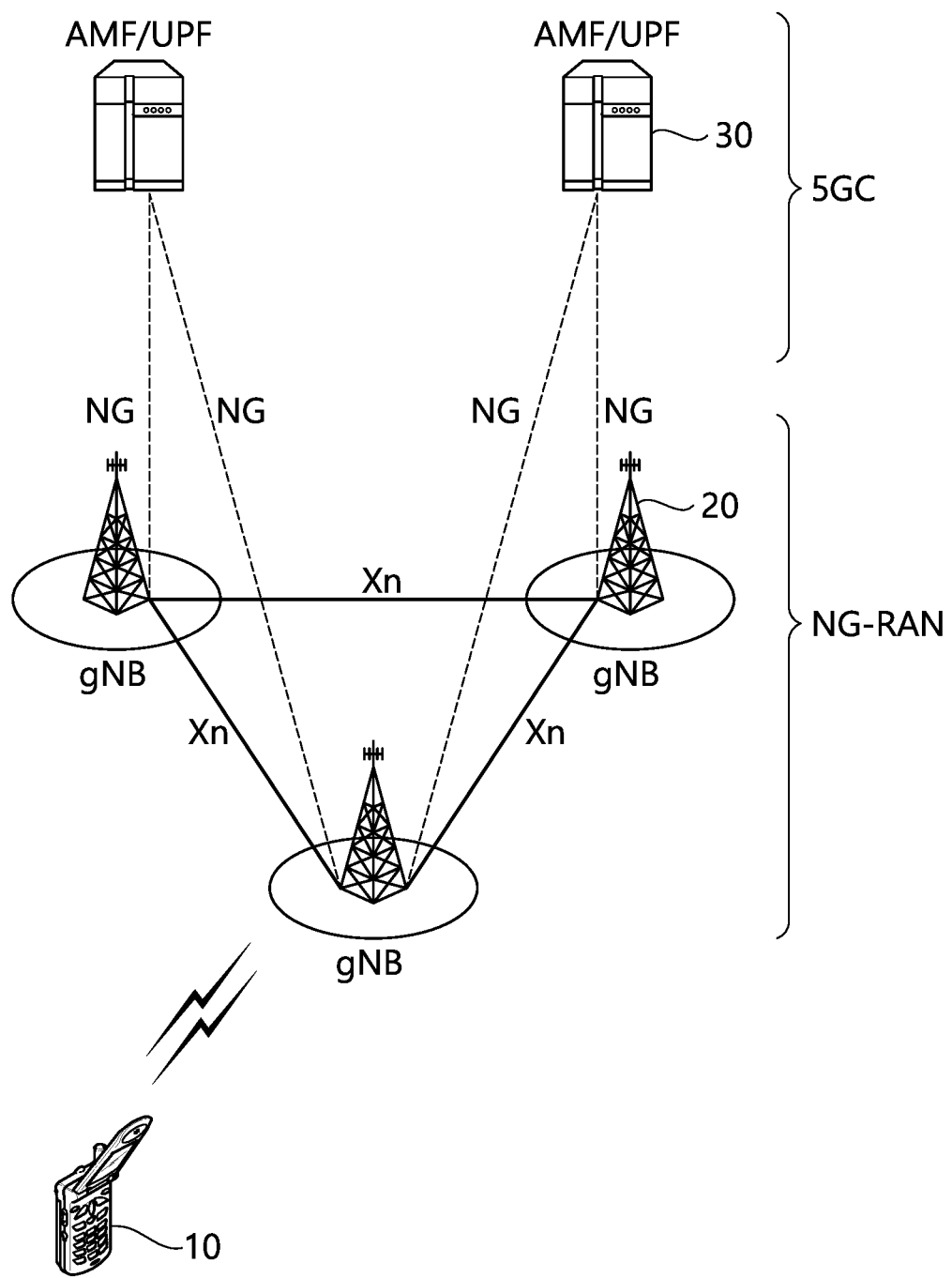
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
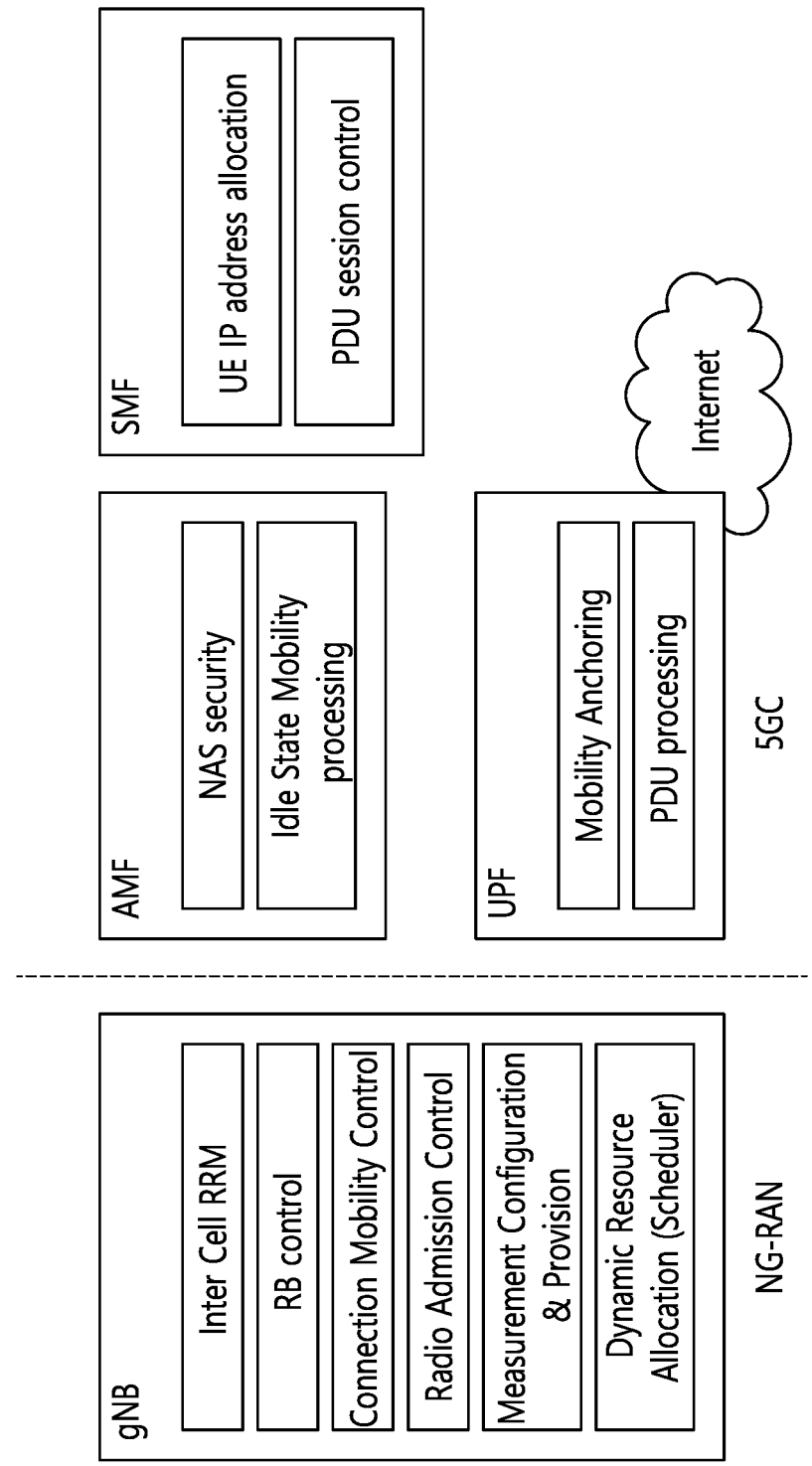
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
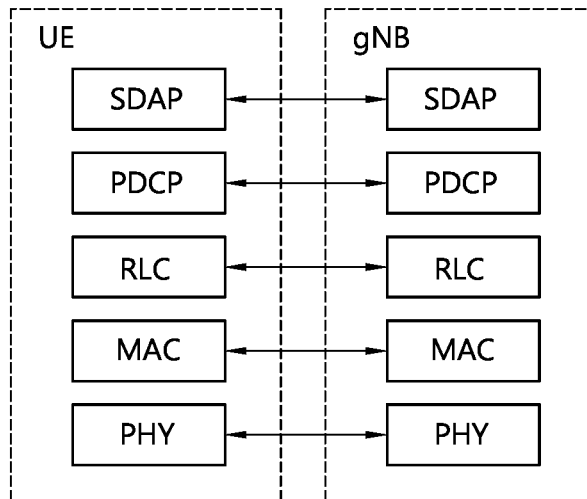
FIG. 4 shows a radio protocol architecture, in accordance with an embodiment of the present disclosure.
Figure 4:
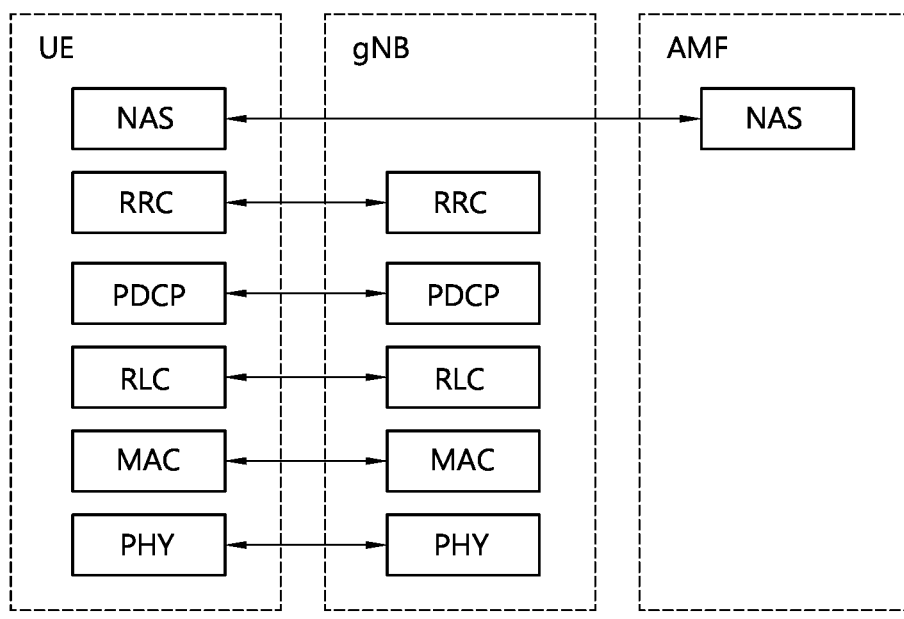

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
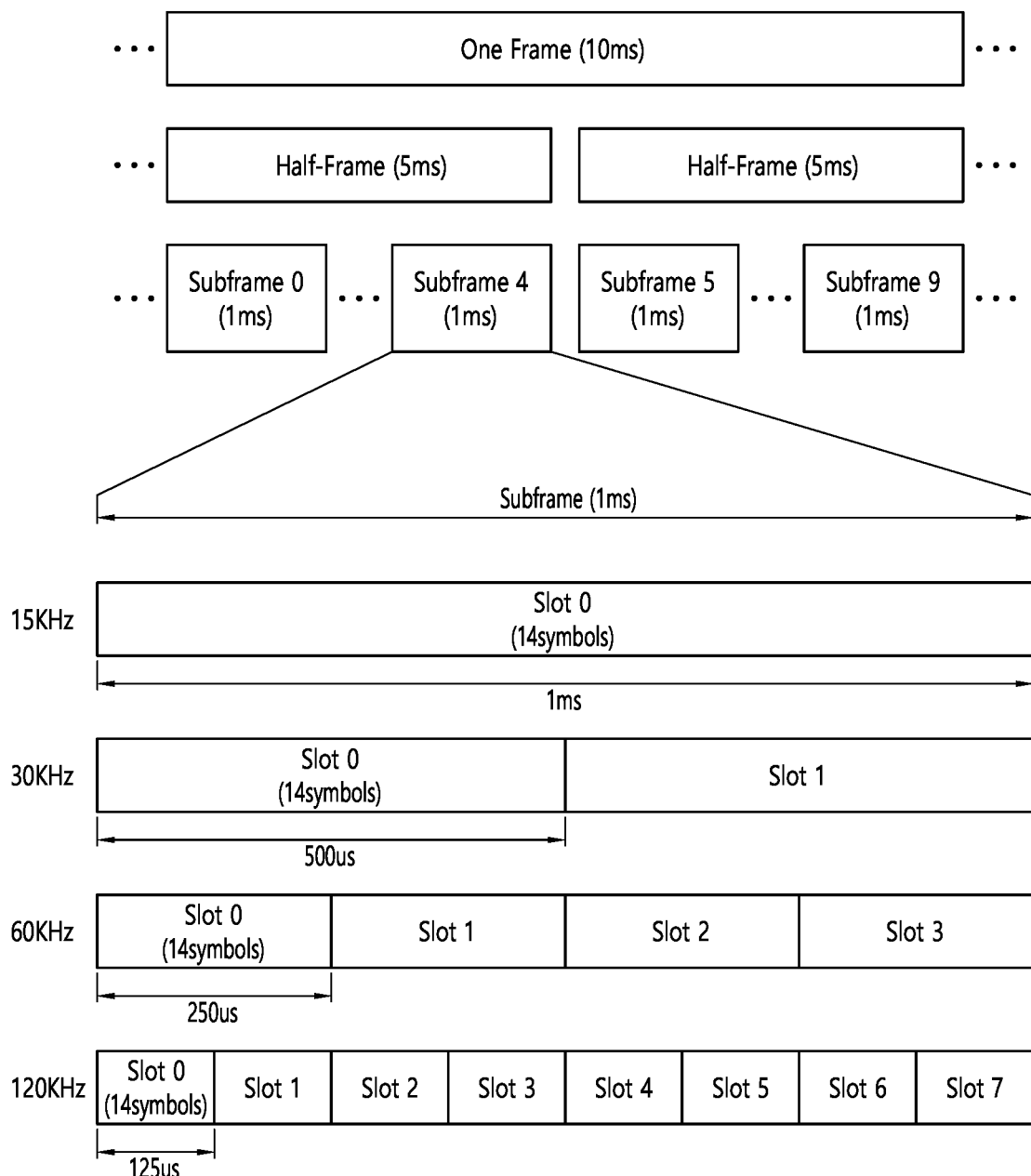
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS (15*2u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2u) | Nslotsymb | Nframe, uslot | Nsubframe, uslot |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
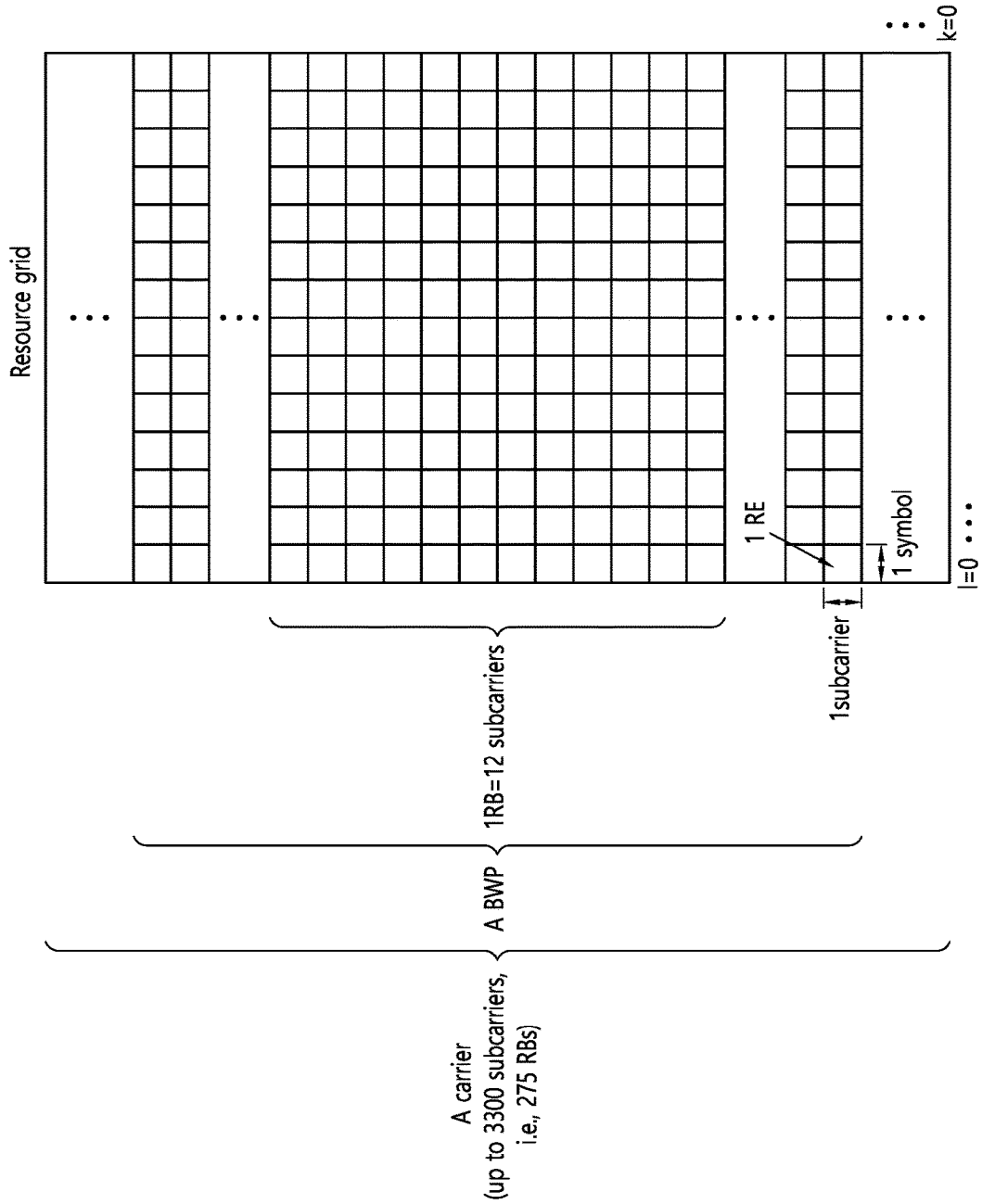
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
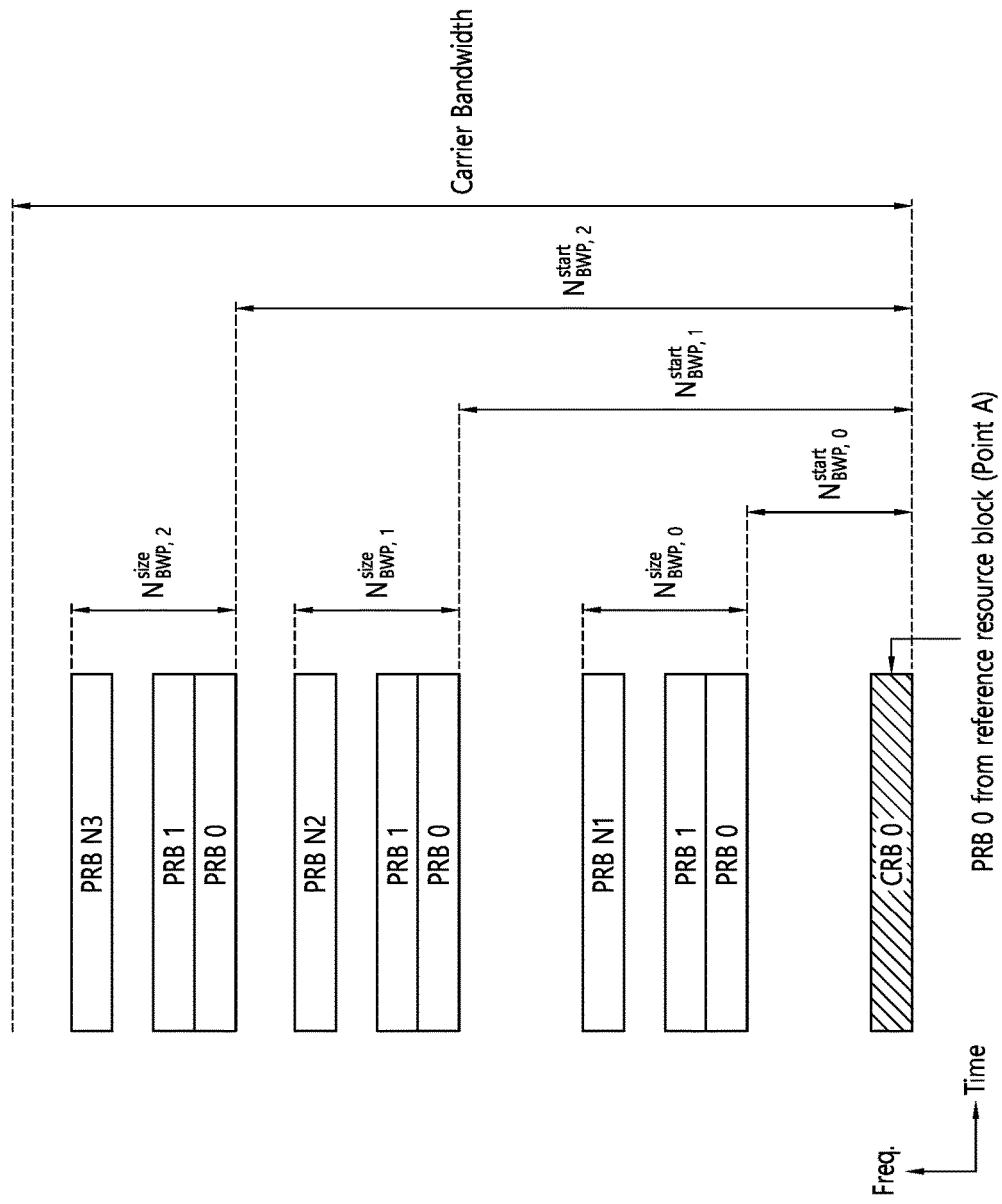
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
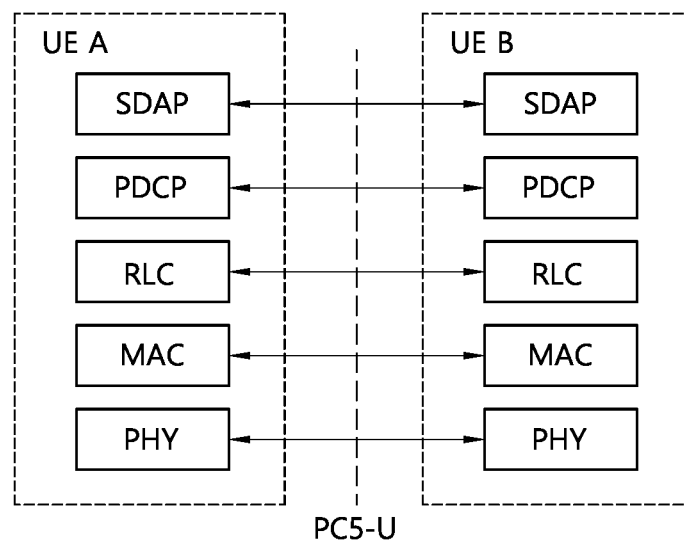
FIG. 8 shows a radio protocol architecture for a SL communication, in accordance with an embodiment of the present disclosure.
Figure 8:
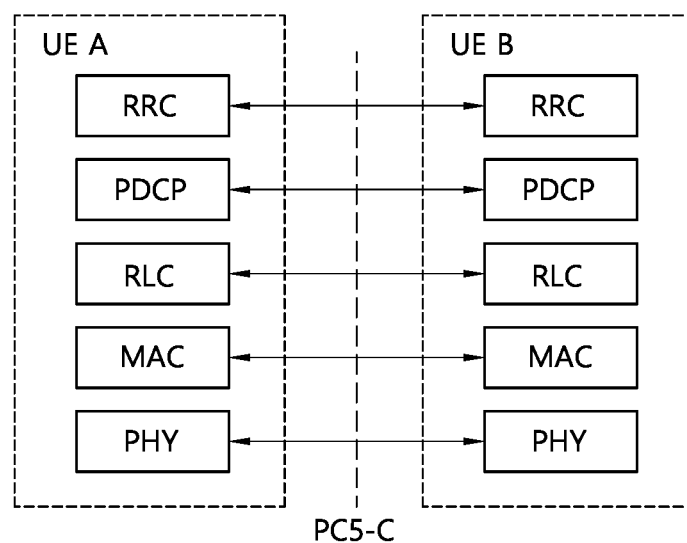

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

Figure 9:
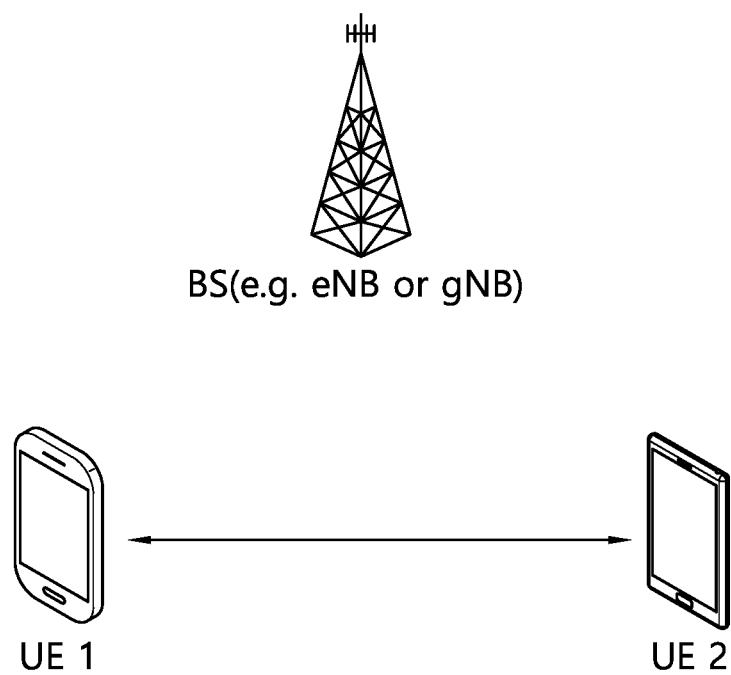
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
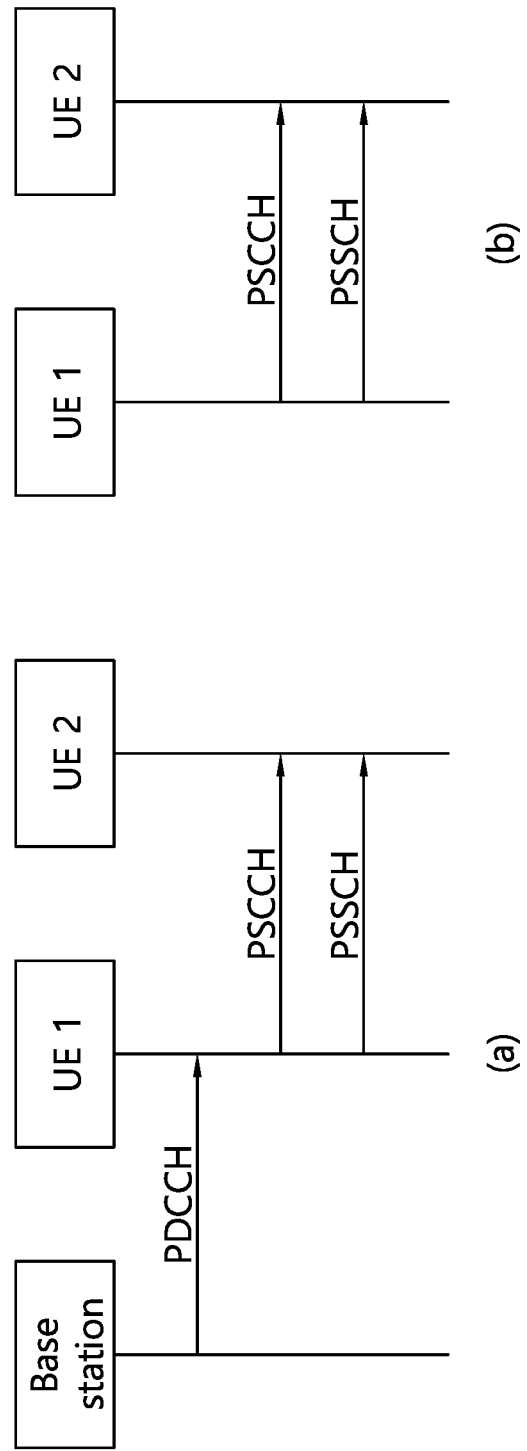
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
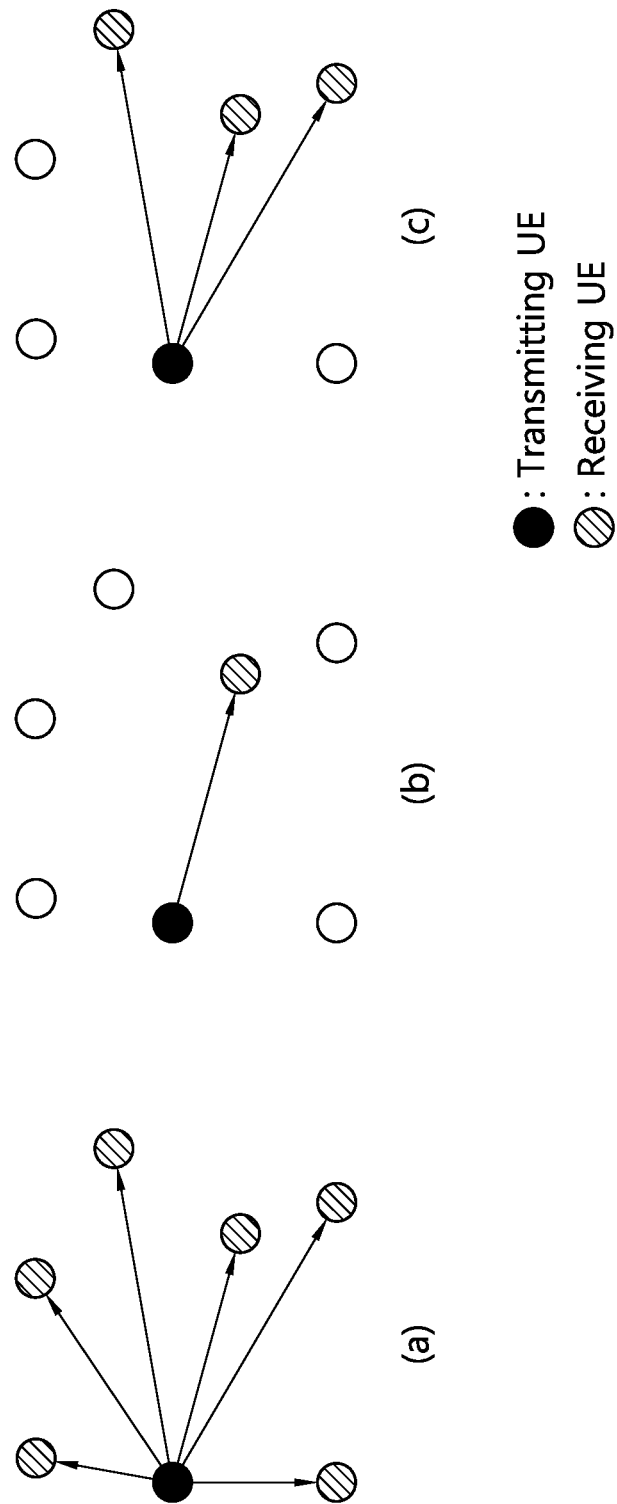
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can send and receive information as a communication terminal, select resources for communication with or without the base station's help depending on the situation, and send and receive messages between terminals.

Hereinafter, the synchronization acquisition of the sidelink UE will be described.

In time division multiple access (TDMA) and frequency division multiples access (FDMA) systems, accurate time and frequency synchronization is essential. If time and frequency synchronization is not accurately performed, system performance may be degraded due to Inter Symbol Interference (ISI) and Inter Carrier Interference (ICI). This is the same in V2X. In V2X, for time/frequency synchronization, a sidelink synchronization signal (SLSS) may be used in the physical layer, and MIB-SL-V2X (master information block-sidelink-V2X) in the radio link control (RLC) layer can be used.

Figure 12:
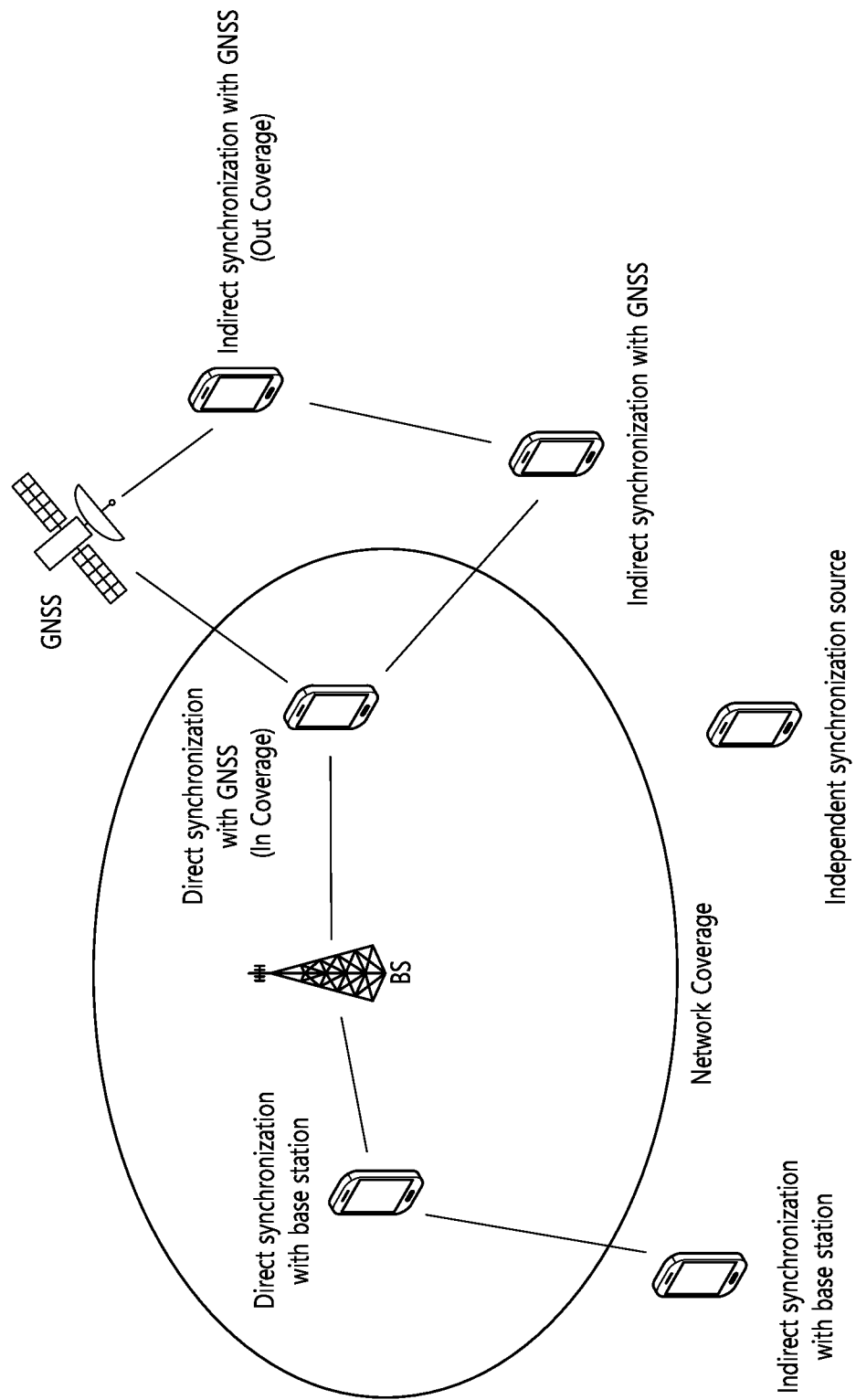
FIG. 12 shows a synchronization source or a synchronization reference in V2X that can be applied to the present disclosure.

FIG. 12 shows a synchronization source or a synchronization reference in V2X that can be applied to the present disclosure.

Referring to FIG. 12, in V2X, a UE may be directly synchronized with global navigation satellite systems (GNSS) or may be indirectly synchronized with GNSS through a UE (being located within the network coverage or located outside of the network coverage) that is directly synchronized with the GNSS. In case the GNSS configures the synchronization source, the UE may use the Coordinated Universal Time (UTC) or a (pre-)configured Direct Frame Number (DFN) so as to calculate a DFN and a subframe number.

Alternatively, the UE may be directly synchronized with a base station, or the UE may be synchronized with another UE being time/frequency-synchronized with the base station. For example, the base station may be a eNB or a gNB. For example, in case the UE is located within the network coverage, the UE may receive synchronization information provided from the base station and may be directly synchronized with the base station. Thereafter, the UE may provide synchronization information to another adjacent UE. In case the base station timing is configured based on a synchronization reference, the UE may follow a cell being related to the corresponding frequency (in case the UE is located inside the cell coverage within the frequency), a primary cell or a serving cell (in case the UE is located outside of the cell coverage within the frequency).

The base station (e.g., serving cell) may provide synchronization configurations for a carrier being used in V2X/sidelink communication. In this case, the UE may follow synchronization configurations received from the base station. If the UE has not detected any cell from the carrier being used in V2X/sidelink communication and has not received any synchronization configuration from the serving cell, the UE may follow pre-determined synchronization configurations.

Alternatively, the UE may also be synchronized with another UE that has failed to directly or indirectly obtain synchronization information from the base station or the GNSS. The source and preference of the synchronization may be pre-determined to the UE. Alternatively, the source and preference of the synchronization may be determined through a control message being provided from the base station.

A sidelink synchronization source may be related to a synchronization priority. For example, the relationship between the synchronization source and the synchronization priority may be defined as shown in Table 5. Table 5 is only an example, and the relationship between the synchronization source and the synchronization priority may be defined in various forms.

TABLE 5

| priority level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

Whether to use GNSS-based synchronization or base station-based synchronization may (pre-) configured. In single-carrier operation, the UE may derive a transmission timing of the UE from the available synchronization reference having the highest priority. Meanwhile, the UE may derive/determine a time/frequency synchronization value related to a selected synchronization reference source (hereinafter, SYN_REF) according to a pre-defined rule. For example, a SYN_REF may include a synchronization source. And, the UE may perform sidelink communication based on the time/frequency synchronization value. For example, if a synchronization quality related to the SYN_REF (hereinafter, SYN_QL) is degraded, the UE may have to search for a completely asynchronous new SYN_REF. For example, if the SYN_QL related to the SYN_REF is lower than a pre-determined threshold value, the UE may have to search for a completely asynchronous new SYN_REF by comparing it with the existing time/frequency synchronization value. However, the procedure for searching for a completely asynchronous new SYN_REF and/or a procedure for deriving/determining a synchronization value for the new SYN_REF may require a high level of complexity. Therefore, there is a need to propose a method for the UE to perform synchronization based on a reference signal from another UE.

Hereinafter, a method for a UE to perform synchronization based on a reference signal from another UE and an apparatus supporting the same according to an embodiment of the present disclosure will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
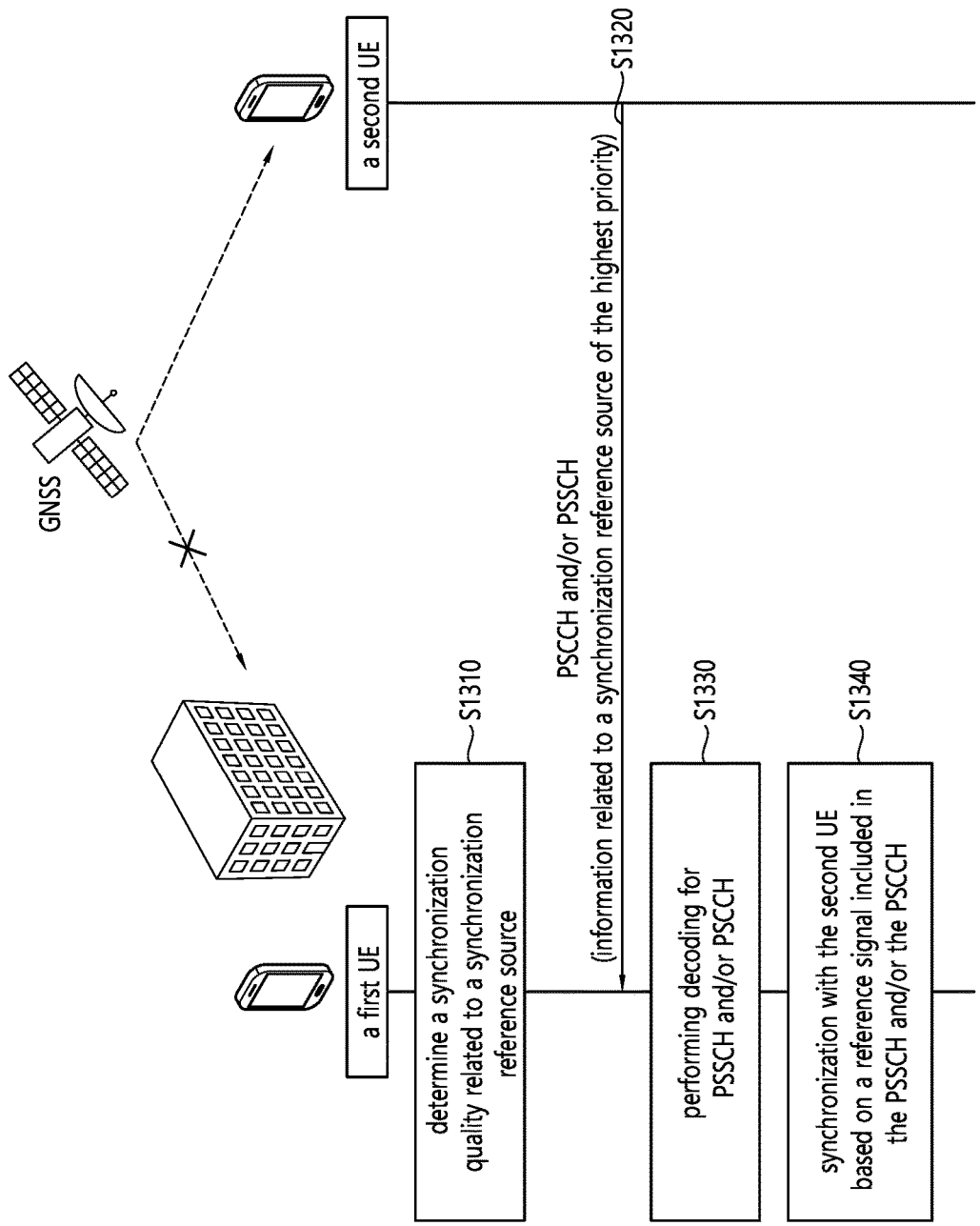
FIG. 13 shows a procedure in which a first UE performs synchronization with a second UE based on a reference signal received from the second UE according to an embodiment of the present disclosure.

FIG. 13 shows a procedure in which a first UE performs synchronization with a second UE based on a reference signal received from the second UE according to an embodiment of the present disclosure.

In an embodiment of FIG. 13, it is assumed that the first UE has selected GNSS, which is a pre-configured SYN_REF of the highest priority (hereinafter, TOP_REF), as the SYN_REF. And, it is assumed that the first UE derives a time/frequency synchronization value based on a signal from the GNSS, and is performing sidelink communication with other UE(s) based on the synchronization value. In an embodiment of FIG. 13, it is assumed that the TOP_REFs of the first UE and the second UE are GNSS, but the present disclosure is not limited thereto, and the TOP_REF of the UE may be configured to any one of GNSS, a base station, or a UE.

Referring to FIG. 13, in step S1310, the first UE may determine SYN_QL related to a SYN_REF. For example, the SYN_QL may be determined based on i) whether the first UE successfully received/detected a synchronization signal (SS) from a SYN_REF, ii) a reception power level of the SS, and/or iii) a reception power level of PBSCH DM-RS (demodulation reference signal).

Furthermore, for example, based on the SYN_QL and/or a pre-determined threshold value related to the SYN_REF, the first UE may determine whether to continue to perform sidelink communication with a time/frequency synchronization value related to the SYN_REF. For example, the threshold value may be autonomously set by the UE. Alternatively, for example, the threshold value may be configured by the base station. For example, the threshold value may be pre-configured by the base station.

For example, if the first UE succeeds in detecting/receiving a SS, the first UE may consider that the SYN_QL is good, and the first UE may determine to continue performing sidelink communication with a time/frequency synchronization value related to the SYN_REF. For example, if the first UE fails to detect/receive a SS, the first UE may consider that the SYN_QL is not good, and the first UE may determine that sidelink communication cannot be performed with a time/frequency synchronization value related to the SYN_REF. Alternatively, for example, if the number of times the first UE succeeds in detecting/receiving a SS during a pre-determined time period is equal to or greater than a pre-determined threshold value or exceeding a pre-determined threshold value, the first UE may consider that SYN_QL is good. And, the first UE may determine to continue performing sidelink communication with a time/frequency synchronization value related to the SYN_REF. For example, if the number of times the first UE succeeds in detecting/receiving a SS during a pre-determined time period is less than or equal to a pre-determined threshold value or less than a pre-determined threshold value, the first UE may consider that SYN_QL is not good. And, the first UE may determine that sidelink communication cannot be performed with a time/frequency synchronization value related to the SYN_REF. Alternatively, for example, if a reception power level of a SS received by the first UE is equal to or greater than a pre-determined threshold value or exceeding a pre-determined threshold value, the first UE may consider that SYN_QL is good. And, the first UE may determine to continue performing sidelink communication with a time/frequency synchronization value related to the SYN_REF. For example, if a reception power level of a SS received by the first UE is less than or equal to a pre-determined threshold value or less than a pre-determined threshold value, the first UE may consider that SYN_QL is not good. And, the first UE may determine that sidelink communication cannot be performed with a time/frequency synchronization value related to the SYN_REF. Alternatively, for example, if a reception power level of a PBSCH DM-RS received by the first UE is equal to or greater than a pre-determined threshold value or exceeding a pre-determined threshold value, the first UE may consider that SYN_QL is good. And, the first UE may determine to continue performing sidelink communication with a time/frequency synchronization value related to the SYN_REF. For example, if a reception power level of a PBSCH DM-RS received by the first UE is less than or equal to a pre-determined threshold value or less than a pre-determined threshold value, the first UE may consider that SYN_QL is not good. And, the first UE may determine that sidelink communication cannot be performed with a time/frequency synchronization value related to the SYN_REF.

In the embodiment of FIG. 13, based on a SYN_QL and/or a pre-determined threshold value related to the SYN_REF, it is assumed that the first UE has determined sidelink communication cannot be performed with a time/frequency synchronization value related to the SYN_REF.

In step S1320, the second UE may transmit information related to a TOP_REF to the first UE. For example, when the second UE currently selects a TOP_REF as a SYN_REF, the second UE may transmit the TOP_REF related information to the first UE. For example, even when the second UE currently selects a device other than a TOP_REF as a SYN_REF, the second UE may transmit the TOP_REF related information to the first UE. That is, information related to the SYN_REF transmitted by the second UE is information related to the TOP_REF configured for the second UE, not information related to the SYN_REF currently selected by the second UE. For example, information related to the TOP_REF may be signaled on a PSCCH and/or a PSSCH. For example, the second UE may transmit a PSCCH and/or a PSSCH including information related to the TOP_REF to the first UE.

The TOP_REF may be pre-configured for the UE. For example, the TOP_REF may be designated/defined as any one of GNSS, a base station, or a UE. For example, the UE may be configured to determine a GNSS as a TOP_REF among the GNSS, a base station, or other UEs. For example, the UE may be configured to determine a base station as a TOP_REF among GNSS, the base station, or other UEs. In the embodiment of FIG. 13, it is assumed that a TOP_REF of UE 1 is GNSS, and a TOP_REF of UE 2 is also GNSS.

The information related to the TOP_REF may include information on whether the second UE is using a TOP_REF as its SYN_REF (hereinafter, INFO_A) and/or information on SYN_QL related to the TOP_REF (hereinafter, INFO_B). In addition, for example, the information related to the TOP_REF may include TOP_REF type information of the second UE. The TOP_REF type information may include information that can identify any one of GNSS, a base station, or other UEs. For example, when the second UE directly synchronizes with the GNSS, INFO_A may be information indicating that the second UE is using a TOP_REF as its SYN_REF. On the other hand, for example, if the second UE performs indirectly synchronization with the GNSS (e.g., through a base station or another UE), INFO_A may be information indicating that the second UE is not using a TOP_REF as its SYN_REF. For example, INFO_B may include information on whether the second UE has successfully detected/received the SS transmitted by a TOP_REF. For example, INFO_B may include information on whether the number of SSs successfully detected/received among SSs transmitted by a TOP_REF during a pre-determined time period by the second UE is greater than a threshold value. For example, INFO_B may include information on a reception power level of the SS transmitted by TOP_REF and/or the PSBCH DM-RS transmitted by TOP_REF. For example, INFO_B may include information on whether a reception power level of the SS transmitted by a TOP_REF and/or the PSBCH DM-RS transmitted by a TOP_REF is higher than a threshold value. For example, the threshold value may be autonomously set by the UE. For example, the threshold value may be configured by the base station. For example, the threshold value may be pre-configured by the base station.

Additionally, for example, the first UE may determine synchronization with the second UE based on information on whether the second UE is using a TOP_REF as the SYN_REF of the second UE and the TOP_REF type information. For example, the first UE may determine whether to perform synchronization with the second UE based on the INFO_A. For example, the first UE may determine synchronization with the second UE based on information that the second UE uses a TOP_REF as the SYN_REF of the second UE. For example, the first UE may determine whether a TOP_REF for the first UE and a TOP_REF for the second UE are the same. For example, when the first UE receives information from the second UE that the second UE uses a TOP_REF as the SYN_REF of the second UE, the first UE may determine whether a TOP_REF for the first UE and the TOP_REF for the second UE are the same based on TOP_REF type information. Based on the determination that a TOP_REF for the first UE and a TOP_REF for the second UE are the same, the first UE may determine synchronization with the second UE.

The first UE may select GNSS, which is TOP_REF, as a SYN_REF, may derive a time/frequency synchronization value based on a synchronization signal from the GNSS, and may perform sidelink communication with another UE based on the synchronization value. In this case, for example, even if a SYN_QL related to the TOP_REF of the first UE is lower than a pre-determined threshold value or the first UE loses synchronization with the TOP_REF, the oscillator of the first UE is may not drift rapidly for a pre-determined time defined as a requirement.

Accordingly, in step S1330, the first UE may receive/decode a PSSCH and/or a PSCCH transmitted by the other UE. For example, the other UE may be a UE using a TOP_REF as a SYN_REF. For example, the other UE may be a UE using a TOP_REF of good SYN_QL as a SYN_REF. The first UE may receive/decode INFO_A and/or INFO_B, and through this, the first UE may identify/distinguish other UE s using a TOP_REF as a SYN_REF. In the embodiment of FIG. 13, it is assumed that the first UE receives a PSSCH and/or a PSCCH from the second UE.

In step S1340, the first UE may perform synchronization with the second UE based on a reference signal included in the PSSCH and/or the PSCCH transmitted by the second UE.

For example, the first UE successfully decodes/receives the PSSCH and/or the PSCCH transmitted by the second UE, and/or if a reception power level of the reference signal on the PSSCH and/or the PSCCH is higher than a pre-determined threshold value, the first UE may derive/track time/frequency synchronization related to a TOP_REF based on the reference signal on the PSSCH and/or PSCCH. For example, the first UE successfully decodes/receives the PSSCH and/or the PSCCH transmitted by the second UE, and/or if a reception power level of the reference signal on the PSSCH and/or the PSCCH is higher than a pre-determined first threshold value, and/or if the number of SSs that the second UE succeeds in detecting/receiving among SSs transmitted by TOP_REF during the pre-determined time period is greater than a pre-determined second threshold value, the first UE may derive/track time/frequency synchronization related to a TOP_REF based on the reference signal on the PSSCH and/or PSCCH. For example, the first UE successfully decodes/receives the PSSCH and/or the PSCCH transmitted by the second UE, and/or if a reception power level of the reference signal on the PSSCH and/or the PSCCH is higher than a pre-determined threshold value, and/or if the second UE successfully detects/receives a SS transmitted by TOP_REF, the first UE may derive/track time/frequency synchronization related to a TOP_REF based on the reference signal on the PSSCH and/or PSCCH. For example, the first UE successfully decodes/receives the PSSCH and/or the PSCCH transmitted by the second UE, and/or if a reception power level of the reference signal on the PSSCH and/or the PSCCH is higher than a pre-determined first threshold value, and/or if a reception power level of a SS transmitted by a TOP_REF and/or a PSBCH DM-RS transmitted by the TOP_REF is higher than a pre-determined second threshold value, the first UE may derive/track time/frequency synchronization related to a TOP_REF based on the reference signal on the PSSCH and/or PSCCH. For example, the reference signal may be a DM-RS. Accordingly, the first UE may select/use the second UE as the SYN_REF of the first UE.

Additionally, for example, a third UE may appear that transmits a DM-RS with a reception power level higher than a reception power level for a DM-RS on a PSSCH and/or a PSCCH from the second UE selected as SYN_REF. In this case, if the first UE successfully decodes the PSSCH and/or the PSCCH of the third UE, the first UE may newly select/use the third UE as the SYN_REF of the first UE. For example, a third UE may appear that transmits a DM-RS with a reception power level greater than or equal to a preset threshold value than a reception power level for a DM-RS on a PSSCH and/or a PSCCH from the second UE selected as SYN_REF. In this case, if the first UE successfully decodes the PSSCH and/or the PSCCH of the third UE, the first UE may newly select/use the third UE as the SYN_REF of the first UE. For example, the third UE may be a UE selecting a TOP REF as a SYN_REF.

Additionally, even if, for example, the first UE loses the second UE used as the SYN_REF and/or the SYN_QL related to the second UE is lower than a pre-determined threshold value, the first UE may transmit/receive a service based on time/frequency synchronization derived from the second UE during a pre-determined time period. For example, the second UE may be a UE selecting a TOP REF as a SYN_REF. In this specification, for example, the service may be a packet, data, or message. In this case, for example, the SYN_QL related to the second UE is determined based on i) whether the first UE has successfully decoded a PSSCH and/or a PSCCH transmitted by the second UE, ii) whether the first UE has successfully detected/received a DM-RS on the PSSCH and/or the PSCCH transmitted by the second UE, and/or iii) a reception power level of a DM-RS on a PSSCH and/or a PSCCH.

Alternatively, in the embodiment of FIG. 13, for example, when the oscillator of the first UE drifts above a certain level, or when a certain time elapses from the time when the first UE loses a SYN_REF, the first UE may not be able to receive/decode a PSSCH and/or a PSCCH transmitted by other UE(s). In this case, for example, the first UE may perform the existing sidelink synchronization procedure. Accordingly, steps S1330 and S1340 may be omitted.

Instead, the first UE may detect a synchronization signal transmitted from other devices, and thereafter, the first UE may perform synchronization with respect to the device that transmitted the detected synchronization signal.

According to an embodiment of the present disclosure, when a synchronization quality between a TOP_REF and a UE is not good, the UE may perform synchronization with the other UE, based on a reference signal from the other UE using a TOP_REF as a SYN_REF. Accordingly, complexity due to a procedure of searching for a completely asynchronous new SYN_REF and/or a procedure of deriving/determining a synchronization value for the new SYN_REF can be reduced.

Figure 14:
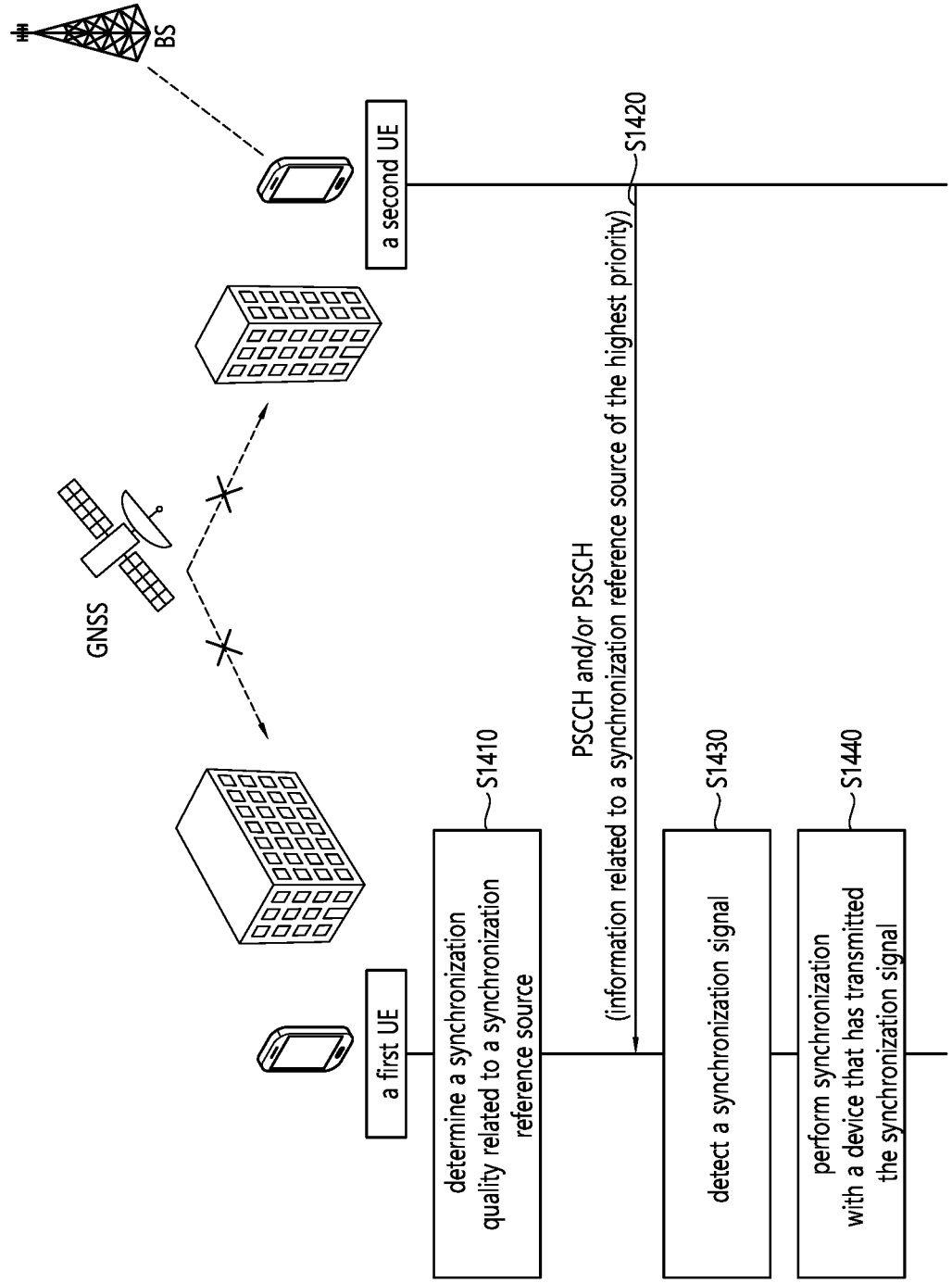
FIG. 14 shows a procedure in which a first UE performs existing sidelink synchronization based on information received from a second UE according to an embodiment of the present disclosure.

FIG. 14 shows a procedure in which a first UE performs existing sidelink synchronization based on information received from a second UE according to an embodiment of the present disclosure.

In an embodiment of FIG. 14, it is assumed that the first UE selects a GNSS, which is a TOP_REF, as a SYN_REF, derives a time/frequency synchronization value based on a signal from the GNSS, and is performing sidelink communication with another UE based on the synchronization value. It is assumed that the second UE selects a base station other than a TOP_REF as a SYN_REF, derives a time/frequency synchronization value based on a signal from the base station, and is performing sidelink communication with another UE based on the synchronization value.

Referring to FIG. 14, in step S1410, the first UE may determine a SYN_QL related to a SYN_REF. Furthermore, for example, based on the SYN_QL and/or a pre-determined threshold value related to the SYN_REF, the first UE may determine that sidelink communication cannot be performed with a time/frequency synchronization value related to the SYN_REF. Since step S1410 is the same as step S1310 of FIG. 13, a detailed description thereof will be omitted.

In step S1420, the second UE may transmit information related to a TOP_REF to the first UE. In the embodiment of FIG. 14, it is assumed that a TOP_REF of the first UE is a GNSS, and a TOP_REF of the second UE is also a GNSS. Therefore, even though the second UE currently selects a base station other than a TOP_REF as a SYN_REF, the second UE may transmit information related to a TOP_REF (i.e., GNSS-related information) to the first UE. For example, the information related to the TOP_REF may be signaled on a PSCCH and/or a PSSCH. For example, the second UE may transmit a PSCCH and/or a PSSCH including the information related to the TOP_REF to the first UE.

The information related to the TOP_REF may include INFO_A and/or INFO_B. In the embodiment of FIG. 14, the second UE may transmit information indicating that the second UE is not currently using the GNSS as its SYN_REF and/or information on SYN_QL related to the GNSS to the first UE. In this case, according to the synchronization state of the first UE and the second UE, the first UE may operate as follows.

(1) Case 1: When a difference value between the synchronization of the first UE and the synchronization of the second UE is within a pre-determined threshold value, the first UE may receive/decode a PSSCH and/or a PSCCH transmitted by the second UE. For example, when a difference value between the synchronization of the GNSS and the synchronization of the base station is within a pre-determined threshold value, the first UE may still receive/decode a PSSCH and/or a PSCCH transmitted by the second UE. For example, when a difference value between the time synchronization of the first UE and the time synchronization of the second UE is within a cyclic prefix (CP) range, and a difference value between the frequency synchronization of the first UE and the frequency synchronization of the second UE is a pre-determined threshold value, the first UE may still receive/decode a PSSCH and/or a PSCCH transmitted by the second UE. As described above, the second UE may be a UE selecting a base station other than a TOP_REF as a SYN_REF.

Accordingly, when the first UE receives information indicating that the second UE is not currently using the GNSS as the SYN_REF and/or information on SYN_QL related to the GNSS from the second UE, the first UE may determine that the second UE cannot be selected/used as the SYN_REF of the first UE. For example, when the first UE receives information from the second UE that the second UE is not currently using the GNSS as the SYN_REF, the first UE may determine that the second UE cannot be selected/used as the SYN_REF of the first UE. In this case, the first UE may perform the existing sidelink synchronization procedure.

(2) Case 2: When a difference value between the synchronization of the first UE and the synchronization of the second UE exceeds a pre-determined threshold value, the first UE may not receive/decode a PSSCH and/or a PSCCH transmitted by the second UE. For example, when a difference value between the synchronization of the GNSS and the synchronization of the base station exceeds a pre-determined threshold value, the first UE may not receive/decode a PSSCH and/or a PSCCH transmitted by the second UE. For example, when a difference value between the time synchronization of the first UE and the time synchronization of the second UE exceeds a cyclic prefix (CP) range, the first UE may not receive/decode a PSSCH and/or a PSCCH transmitted by the second UE. For example, when a difference value between the frequency synchronization of the first UE and the frequency synchronization of the second UE exceeds a pre-determined threshold value, the first UE may still receive/decode a PSSCH and/or a PSCCH transmitted by the second UE. As described above, the second UE may be a UE selecting a base station other than a TOP_REF as a SYN_REF. Accordingly, the first UE that has failed to receive/decode the PSSCH and/or the PSCCH transmitted by the second UE may perform the existing sidelink synchronization procedure.

In step S1430, the first UE may detect a synchronization signal, and in step S1440, the first UE may perform synchronization with a device that has transmitted the detected synchronization signal.

Alternatively, in the embodiment of FIG. 14, for example, when the oscillator of the first UE drifts above a certain level, or when a certain time elapses from the time when the first UE loses a SYN_REF, the first UE may no longer receive/decode a PSSCH and/or a PSCCH transmitted by another UE that has selected a TOP_REF as a SYN_REF. In this case, for example, the first UE may perform the existing sidelink synchronization procedure. In step S1430, the first UE may detect a synchronization signal, and in step S1440, the first UE may perform synchronization with a device that has transmitted the detected synchronization signal.

Figure 15:
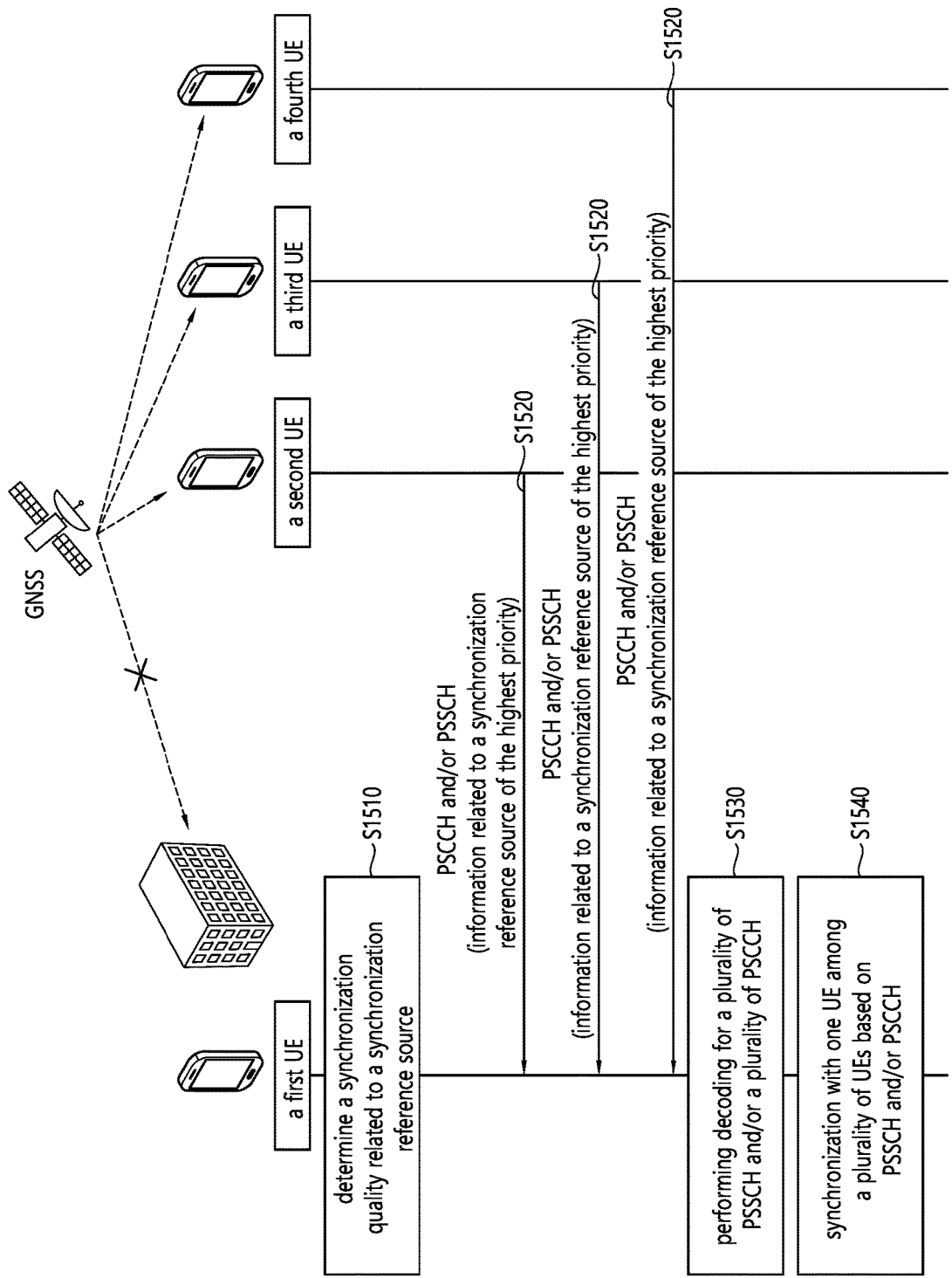
FIG. 15 shows a procedure in which the first UE performs synchronization with one UE based on information received from a plurality of UEs according to an embodiment of the present disclosure.

FIG. 15 shows a procedure in which the first UE performs synchronization with one UE based on information received from a plurality of UEs according to an embodiment of the present disclosure.

In an embodiment of FIG. 15, it is assumed that the first UE to the fourth UE select the GNSS, which is a TOP_REF, as a SYN_REF, derive a time/frequency synchronization value based on a signal from the GNSS, and are performing sidelink communication with other UE(s) based on the synchronization value.

Referring to FIG. 15, in step S1510, the first UE may determine SYN_QL related to a SYN_REF. For example, the first UE may determine the SYN_QL related to the SYN_REF currently used by the first UE. Furthermore, for example, based on the SYN_QL and/or a pre-determined threshold value related to the SYN_REF, the first UE may determine that sidelink communication cannot be performed with a time/frequency synchronization value related to the SYN_REF. Since step S1510 is the same as step S1310 of FIG. 13, a detailed description thereof will be omitted.

In step S1520, the second to fourth UEs may transmit information related to a TOP_REF to the first UE. In the embodiment of FIG. 15, it is assumed that TOP_REFs of the first UE to the fourth UE are GNSS. The information related to the TOP_REF may be signaled on a PSCCH and/or a PSSCH. For example, the second to fourth UEs may transmit a PSCCH and/or a PSSCH including information related to the TOP_REF to the first UE. For example, the information related to the TOP_REF may include INFO_A and/or INFO_B. Since detailed descriptions of INFO_A and/or INFO_B have already been described above, they will be omitted.

In step S1530, it is assumed that the first UE can still receive/decode the PSSCH and/or the PSCCH transmitted to the second to fourth UEs. Accordingly, the first UE may receive/decode the PSSCH and/or the PSCCH transmitted to the second to fourth UEs. For example, the first UE may receive/decode each INFO_A and/or INFO_B, and through this, the first UE may identify/distinguish the second to fourth UEs using a TOP_REF as a SYN_REF.

Therefore, in step S1540, based on the decoded PSSCH and/or PSCCH, the first UE may perform synchronization with any one of the second to fourth UEs. For example, when there are a plurality of UEs having a same DM-RS reception power level of PSSCH and/or PSCCH successfully decoded/received by the first UE, the first UE may select/use a UE having the best SYN_QL related to a TOP_REF as a SYN_REF. For example, if there are a plurality of UEs in which a DM-RS reception power level of the PSSCH and/or PSCCH successfully decoded/received by the first UE is smaller than a pre-determined difference value, the first UE may select/use a UE having the best SYN_QL related to a TOP_REF as a SYN_REF. For example, the first UE may know the SYN_QL related to the TOP_REF based on the INFO_B.

Furthermore, for example, if there are a plurality of UEs having the best SYN_QL (i.e., SYN_QL related to a TOP_REF), the first UE may randomly select one from among the plurality of UEs, and may select/use the selected one UE as a SYN_REF. Alternatively, for example, when there are a plurality of UEs in which SYN_QL (i.e., SYN_QL related to a TOP_REF) is smaller than a pre-determined difference value/level, the first UE may randomly select one from among the plurality of UEs, and may select/use the selected one UE as a SYN_REF.

According to an embodiment of the present disclosure, when the synchronization quality between a TOP_REF and the UE is not good, based on a reference signal from another UE using a TOP_REF as a SYN_REF, the UE may perform synchronization with the another UE. Furthermore, when a plurality of UEs having SYN_QL related to a TOP_REF exist near the UE, the UE may finally select/use a UE having the best SYN_QL as the SYN_REF based on INFO_B transmitted by the plurality of UEs. Accordingly, complexity due to a procedure of searching for a completely asynchronous new SYN_REF and/or a procedure of deriving/determining a synchronization value for the new SYN_REF can be reduced.

Figure 16:
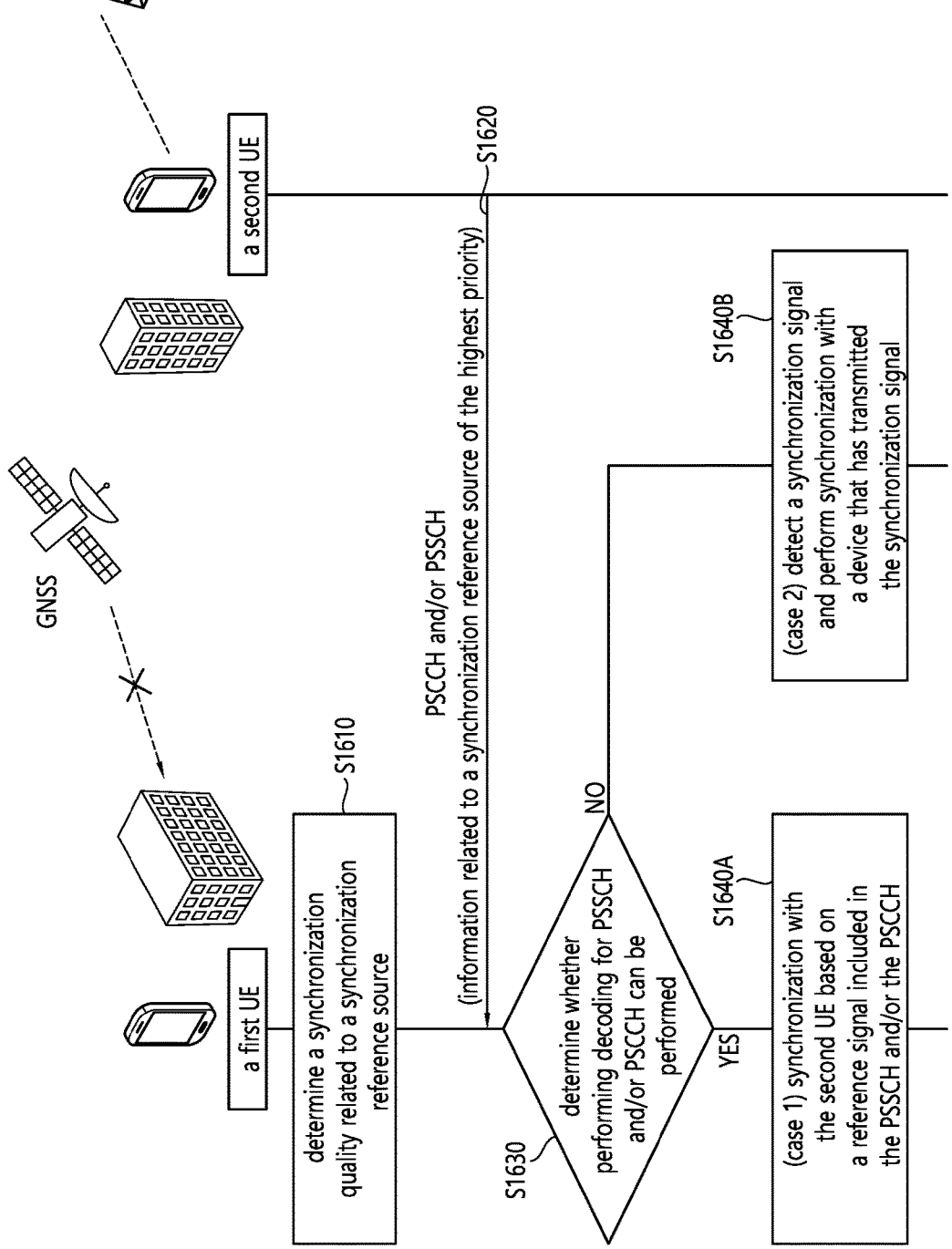
FIG. 16 shows a procedure in which a first UE performs a sidelink synchronization procedure based on information received from a second UE according to an embodiment of the present disclosure.

FIG. 16 shows a procedure in which a first UE performs a sidelink synchronization procedure based on information received from a second UE according to an embodiment of the present disclosure.

In an embodiment of FIG. 16, it is assumed that the first UE selects a GNSS, which is a TOP_REF, as a SYN_REF, derives a time/frequency synchronization value based on a signal from the GNSS, and is performing sidelink communication with another UE based on the synchronization value. It is assumed that the second UE selects a base station, which is a TOP_REF, as a SYN_REF, derives a time/frequency synchronization value based on a signal from the base station, and is performing sidelink communication with another UE based on the synchronization value. That is, unlike the TOP_REF of the second UE is a GNSS in the embodiment of FIG. 14, the TOP_REF of the second UE in the embodiment of FIG. 16 is a base station.

Referring to FIG. 16, in step S1610, the first UE may determine a SYN_QL related to a SYN_REF. Furthermore, for example, based on the SYN_QL and/or a pre-determined threshold value related to the SYN_REF, the first UE may determine that sidelink communication cannot be performed with a time/frequency synchronization value related to the SYN_REF. Since step S1610 is the same as step S1310 of FIG. 13, a detailed description thereof will be omitted.

In step S1620, the second UE may transmit information related to a TOP_REF to the first UE. In the embodiment of FIG. 16, it is assumed that a TOP_REF of the first UE is a GNSS, and a TOP_REF of the second UE is a base station. The information related to the TOP_REF may include INFO_A and/or INFO_B. In the embodiment of FIG. 16, for example, since the second UE is currently using the base station that is a TOP_REF as a SYN_REF, the second UE may transmit information indicating that TOP_REF is used as its SYN_REF and/or information on the SYN_QL related to the base station to the first UE. In this case, according to the synchronization state of the first UE and the second UE, the first UE may operate as follows.

(1) Case 1

In step S1630, when a difference value between the synchronization of the first UE and the synchronization of the second UE is within a pre-determined threshold value, the first UE may receive/decode a PSSCH and/or a PSCCH transmitted by the second UE. For example, when a difference value between the synchronization of the GNSS and the synchronization of the base station is within a pre-determined threshold value, the first UE may still receive/decode a PSSCH and/or a PSCCH transmitted by the second UE. For example, when a difference value between the time synchronization of the first UE and the time synchronization of the second UE is within a cyclic prefix (CP) range, and a difference value between the frequency synchronization of the first UE and the frequency synchronization of the second UE is a pre-determined threshold value, the first UE may still receive/decode a PSSCH and/or a PSCCH transmitted by the second UE. As described above, the second UE may be a UE selecting a base station that is a TOP_REF as a SYN_REF. Accordingly, the first UE may receive/decode INFO_A and/or INFO_B, through which the first UE may know that the second UE is selecting a TOP_REF as a SYN_REF, and the first UE may know the SYN_QL related to the base station.

In step S1640A, the first UE may perform synchronization with the second UE based on a PSSCH and/or a reference signal included in a PSCCH transmitted by the second UE.

For example, the first UE successfully decodes/receives the PSSCH and/or the PSCCH transmitted by the second UE, and/or if a reception power level of the reference signal on the PSSCH and/or the PSCCH is higher than a pre-determined threshold value, the first UE may derive/track time/frequency synchronization related to a TOP_REF based on the reference signal on the PSSCH and/or PSCCH. For example, the first UE successfully decodes/receives the PSSCH and/or the PSCCH transmitted by the second UE, and/or if a reception power level of the reference signal on the PSSCH and/or the PSCCH is higher than a pre-determined first threshold value, and/or if the number of SSs that the second UE succeeds in detecting/receiving among SSs transmitted by TOP_REF during the pre-determined time period is greater than a pre-determined second threshold value, the first UE may derive/track time/frequency synchronization related to a TOP_REF based on the reference signal on the PSSCH and/or PSCCH. For example, the first UE successfully decodes/receives the PSSCH and/or the PSCCH transmitted by the second UE, and/or if a reception power level of the reference signal on the PSSCH and/or the PSCCH is higher than a pre-determined threshold value, and/or if the second UE successfully detects/receives a SS transmitted by a TOP_REF, the first UE may derive/track time/frequency synchronization related to a TOP_REF based on the reference signal on the PSSCH and/or PSCCH. For example, the first UE successfully decodes/receives the PSSCH and/or the PSCCH transmitted by the second UE, and/or if a reception power level of the reference signal on the PSSCH and/or the PSCCH is higher than a pre-determined first threshold value, and/or if a reception power level of a SS transmitted by a TOP_REF and/or a PSBCH DM-RS transmitted by the TOP_REF is higher than a pre-determined second threshold value, the first UE may derive/track time/frequency synchronization related to a TOP_REF based on the reference signal on the PSSCH and/or PSCCH. For example, the reference signal may be a DM-RS. Accordingly, the first UE may select/use the second UE as the SYN_REF of the first UE.

(2) Case 2

In step S1630, when a difference value between the synchronization of the first UE and the synchronization of the second UE exceeds a pre-determined threshold value, the first UE may not receive/decode a PSSCH and/or a PSCCH transmitted by the second UE. For example, when a difference value between the synchronization of the GNSS and the synchronization of the base station exceeds a pre-determined threshold value, the first UE may not receive/decode a PSSCH and/or a PSCCH transmitted by the second UE. For example, when a difference value between the time synchronization of the first UE and the time synchronization of the second UE exceeds a cyclic prefix (CP) range, the first UE may not receive/decode a PSSCH and/or a PSCCH transmitted by the second UE. For example, when a difference value between the frequency synchronization of the first UE and the frequency synchronization of the second UE exceeds a pre-determined threshold value, the first UE may not receive/decode a PSSCH and/or a PSCCH transmitted by the second UE. Accordingly, the first UE that has failed to receive/decode the PSSCH and/or the PSCCH transmitted by the second UE may perform the existing sidelink synchronization procedure.

In step S1640B, the first UE may detect a synchronization signal, and the first UE may perform synchronization with a device that has transmitted the detected synchronization signal.

Furthermore, according to an embodiment of the present disclosure, if the UE loses synchronization with the existing TOP_REF (e.g., GNSS), the UE may track a time/frequency synchronization using a reference signal on a specific channel transmitted by another UE that derives the time/frequency synchronization based on the TOP_REF. For example, if the first UE loses synchronization with a pre-configured TOP_REF (e.g., GNSS) because a pre-defined condition is not satisfied, the first UE may track a time/frequency synchronization using a DM-RS on a PSCCH and/or PSSCH transmitted by the second UE that derives the time/frequency synchronization based on the TOP_REF. In this case, for example, after the UE assumes that it is directly or indirectly synchronized to the TOP_REF, the UE may set a related sidelink synchronization signal (SLSS) ID value and/or a PSBCH field value. For example, the first UE may perform synchronization with the second UE, and the first UE may set it as if the first UE was directly synchronized to the TOP_REF. For example, the first UE may perform synchronization with the second UE, and the first UE may set the first UE to be directly related to the synchronized state to the TOP_REF. For example, the first UE may perform synchronization with the second UE, and the first UE may set at least one of an SLSS ID value or a PSBCH field value related to a directly synchronized state. For example, the first UE may perform sidelink communication using at least one of an SLSS ID value or a PSBCH field value related to a directly synchronized state.

According to one embodiment, the second UE may transmit information on whether the second terminal is directly synchronized to a TOP_REF and/or information on whether a synchronization quality related to the TOP_REF is maintaining the synchronization quality greater than or equal to a pre-determined threshold value, through pre-defined signaling. For example, the second UE may perform the pre-defined signaling through a PSCCH and/or a PSSCH. For example, the second UE may simultaneously transmit, to another UE through MAC/RRC signaling, information on whether the second terminal is directly synchronized to a TOP_REF and/or information on whether a synchronization quality related to the TOP_REF is maintaining the synchronization quality greater than or equal to a pre-determined threshold value. For example, the second UE may simultaneously transmit, to another UE through the indicator on the SCI, information on whether the second terminal is directly synchronized to a TOP_REF and/or information on whether a synchronization quality related to the TOP_REF is maintaining the synchronization quality greater than or equal to a pre-determined threshold value. For example, the second UE may perform the pre-defined signaling using 1 bit. For example, if a synchronization quality related to a TOP_REF maintains the synchronization quality greater than or equal to a pre-determined threshold, the second UE may set the pre-defined signaling related value to "1".

According to an embodiment, the pre-defined signaling may be performed when an SLSS transmission resource is not configured and/or when an SLSS transmission resource is configured but actual SLSS transmission is deactivated.

For example, the pre-defined signaling may be performed when GNSS-based time/frequency synchronization is derived.

According to an embodiment, when the pre-defined signaling is configured, the UE synchronized to a SYN_REF other than a TOP_REF may set the signaling value to "0". For example, a UE that has lost synchronization with a TOP_REF may indicate other UEs not to track a time/frequency synchronization based on a reference signal on a specific channel (e.g., a DM-RS on a PSCCH and/or a PSSCH) transmitted by the UE through the pre-defined signaling.

According to an embodiment, even if the first UE detects a SYN_REF having a lower priority than a TOP_REF, it may be configured so that the first UE does not change a synchronization source. Exceptionally, for example, if a reception power of a PSBCH DM-RS or a PSSCH DM-RS measured from a SYN_REF having a lower priority than a TOP_REF by the first UE is greater than or equal to a pre-determined threshold, the first UE may set to change a synchronization source to the SYN_REF having a lower priority than the TOP_REF.

According to one embodiment, the first UE may indicate not to track time/frequency synchronization with a reference signal on a specific channel (e.g., PSSCH DM-RS) transmitted by the first UE through signaling. For example, the first UE may indicate other UEs not to track time/frequency synchronization by using a DM-RS on a PSCCH and/or a PSSCH transmitted by the first UE through pre-defined signaling (For example, it can be interpreted to mean the quality of the connection with a TOP_REF). When the synchronization quality between the first terminal and TOP_REF is degraded, by transmitting the corresponding synchronization quality to another UE, the first UE may indicate not to track time/frequency synchronization using a DMRS on the a PSCCH and/or a PSSCH transmitted by the first UE.

In this specification, for convenience of explanation, a method in which a UE using a TOP_REF as a SYN_REF performs synchronization with another UE using a TOP_REF as a SYN_REF has been mainly described. However, the present disclosure is not limited thereto, and even when a UE that used a TOP_REF as a SYN_REF or a UE that used a pre-configured specific SYN_REF performs synchronization with another UE using a pre-configured specific SYN_REF, the present disclosure may be applied.

Figure 17:
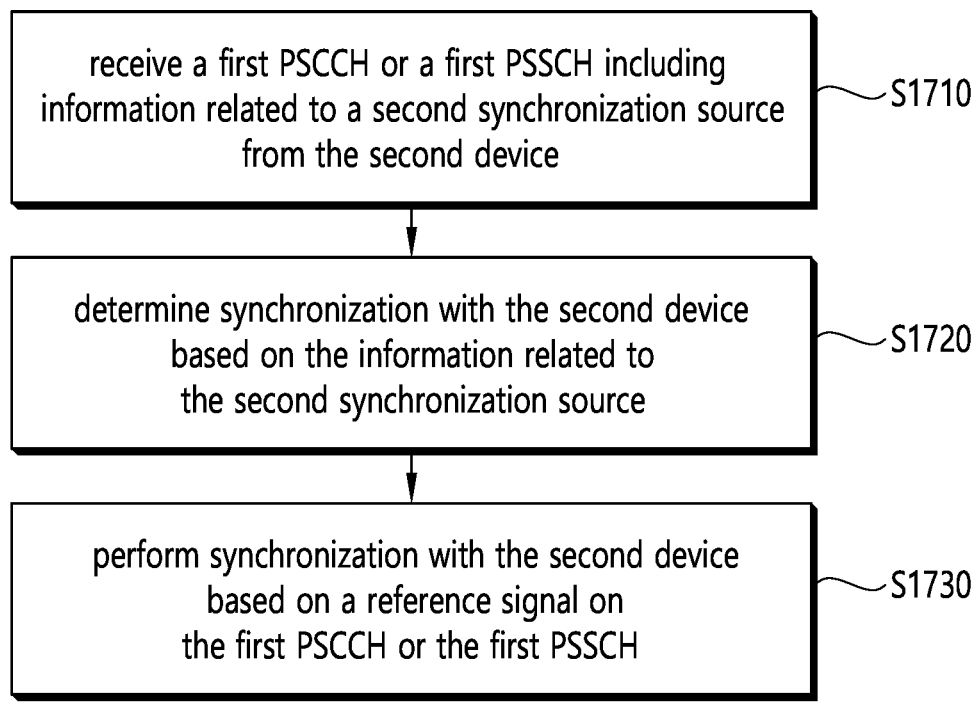
FIG. 17 shows a method in which a first device 100 performs synchronization with a second device 200 based on a reference signal received from the second device 200 according to an embodiment of the present disclosure.

FIG. 17 shows a method in which a first device 100 performs synchronization with a second device 200 based on a reference signal received from the second device 200 according to an embodiment of the present disclosure.

Referring to FIG. 17, in step S1710, the first device 100 may receive a first PSCCH or a first PSSCH including information related to a second synchronization source from the second device 200. For example, the second synchronization source may include a synchronization source having the highest priority pre-configured for the second device 200. For example, the information related to the second synchronization source may include information related to whether the second device 200 uses the second synchronization source and information related to a synchronization quality of the second synchronization source for the second device 200. For example, the information related to the second synchronization source may include information identifying a type of the second synchronization source.

For example, the first device 100 may determine a synchronization quality related to the first synchronization source. For example, the first synchronization source may include a synchronization source of the highest priority pre-configured for the first device 100. For example, the first device 100 may determine a synchronization quality related with the first synchronization source based on the number of times the first device 100 receives a synchronization signal from the first synchronization source. For example, the first device 100 may determine synchronization with the second device 200 based on determining that the synchronization quality related to the first synchronization source is lower than a pre-determined threshold value.

In step S1720, the first device 100 may determine synchronization with the second device 200 based on the information related to the second synchronization source. For example, the first device 100 may determine synchronization with the second device 200 based on the second device 200 using the second synchronization source as a synchronization source. For example, the first device 100 may determine whether the synchronization source of the highest priority pre-configured for the first device 100 is the same as the second synchronization source based on the information related to the second synchronization source. For example, when the synchronization source of the highest priority pre-configured for the first device 100 and the second synchronization source are the same, the first device 100 may determine synchronization with the second device 200 based on the second device 200 using the second synchronization source as the synchronization source.

In step S1730, the first device 100 may perform synchronization with the second device 200 based on a reference signal on the first PSCCH or the first PSSCH. For example, the first device 100 may synchronize with the second device 200 based on the number of times the second device 200 successfully receives a synchronization signal of the second synchronization source is greater than a pre-determined threshold value. For example, the first device 100 may synchronize with the second device 200 based on that a reception power level of a physical sidelink broadcast channel (PSBCH) reference signal received by the second device from the second synchronization source is higher than a pre-determined threshold level. For example, the first device 100 may perform synchronization with the second device 200 based on at least one of a PSBCH field value or a sidelink synchronization signal (SLSS) ID value of the second device 200.

For example, the first device 100 may receive a second PSCCH or a second PSSCH including information related to a third synchronization source from a third device. For example, the first device 100 may determine synchronization with the third device based on the information related to the second synchronization source and the information related to the third synchronization source. For example, the third synchronization source may include a synchronization source having the highest priority pre-configured for the third device. For example, the information related to the third synchronization source may include information related to whether the third device uses the third synchronization source and information related to a synchronization quality of the third synchronization source for the third device. For example, the information related to the third synchronization source may include information identifying a type of the third synchronization source. For example, the first device 100 may determine synchronization with the third device based on the third device using the third synchronization source as a synchronization source. For example, the first device 100 may determine synchronization with the third device based on that a synchronization quality related to the third synchronization source is better than a synchronization quality related to the second synchronization source. For example, the first device 100 may determine whether a difference value between a reception power level of a demodulation reference signal (DM-RS) on the first PSCCH or first PSSCH and a reception power level of a DM-RS on the second PSCCH or the second PSSCH is smaller than a pre-determined threshold value. For example, when the difference value between a reception power level of a DM-RS on the first PSCCH or first PSSCH and a reception power level of a DM-RS on the second PSCCH or the second PSSCH is smaller than a pre-determined threshold value, based on a synchronization quality related to the third synchronization source being better than a synchronization quality related to the second synchronization source, the first device 100 may determine synchronization with the third device. For example, the first device 100 may perform synchronization with the third device based on a reference signal of the second PSCCH or the second PSSCH.

Figure 18:
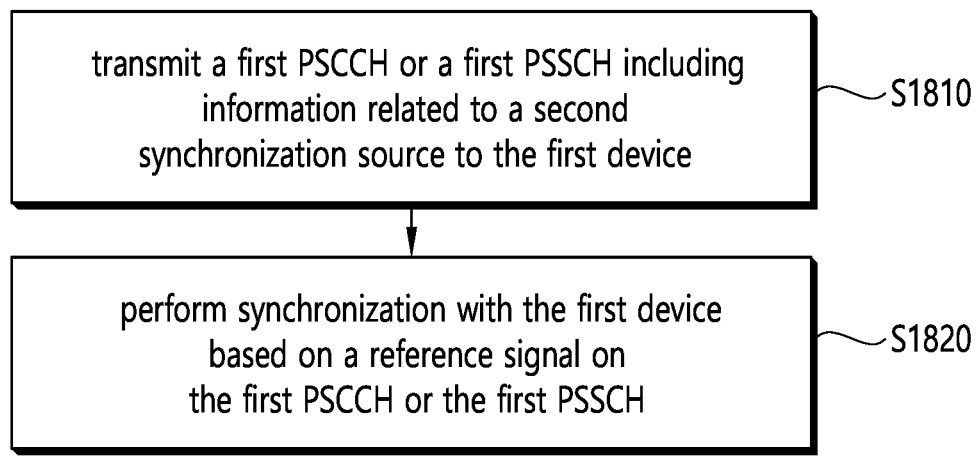
FIG. 18 shows a method of performing synchronization with a first device 100 based on information transmitted by a second device 200 to the first device 100 according to an embodiment of the present disclosure.

FIG. 18 shows a method of performing synchronization with a first device 100 based on information transmitted by a second device 200 to the first device 100 according to an embodiment of the present disclosure.

Referring to FIG. 18, in step S1810, the second device 200 may transmit a first PSCCH or a first PSSCH including information related to a second synchronization source to the first device 100. For example, synchronization with the second device 200 may be determined based on the information related to the second synchronization source. For example, the second synchronization source may include a synchronization source having the highest priority pre-configured for the second device 200. For example, the information related to the second synchronization source may include information related to whether the second device 200 uses the second synchronization source and information related to a synchronization quality of the second synchronization source for the second device 200. For example, the information related to the second synchronization source may include information identifying a type of the second synchronization source. For example, the second device 200 may transmit, to the first device 100, at least one of information on whether the second device 200 is directly synchronized with the second synchronization source or information on whether the second device 200 maintains a synchronization quality equal to or greater than a pre-determined threshold value for the second synchronization source.

In step S1820, the second device 200 may perform synchronization with the first device 100 based on a reference signal on the first PSCCH or the first PSSCH. For example, if the number of times the first device 100 has successfully received a synchronization signal of the second synchronization source is greater than a pre-determined threshold value, the second device 200 may perform synchronization with the first device 100. For example, if a reception power level of the PSBCH (physical sidelink broadcast channel) reference signal received by the first device 100 from the second synchronization source is higher than a pre-determined threshold level, the second device 200 may perform synchronization with the first device 100.

Since examples of the above-described proposed method may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods. The rule may be defined so that the information on whether the proposed methods are applied (or information on the rules of the proposed methods) is notified by the base station to the UE or the transmitting UE to the receiving terminal through a pre-defined signal (e.g., physical layer signal or higher layer signal).

Various embodiments of the present disclosure may be applied not only to vehicle-to-vehicle communication, but also to vehicle-to-pedestrian communication, vehicle-to-base station communication, or vehicle-to-fixed node communication. For example, in communication with a base station, the position and speed of the counterpart receiver may be regarded as fixed.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
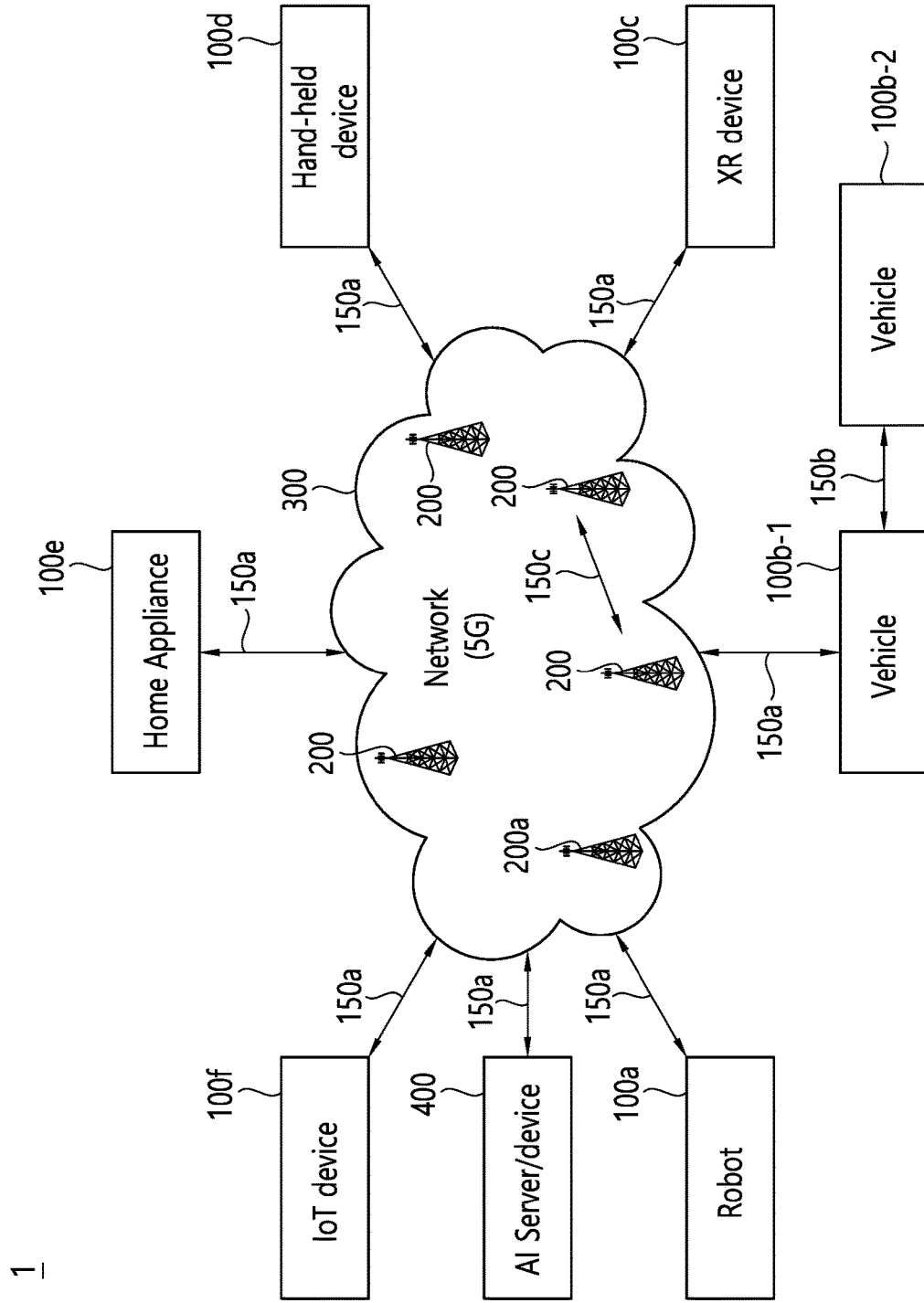
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
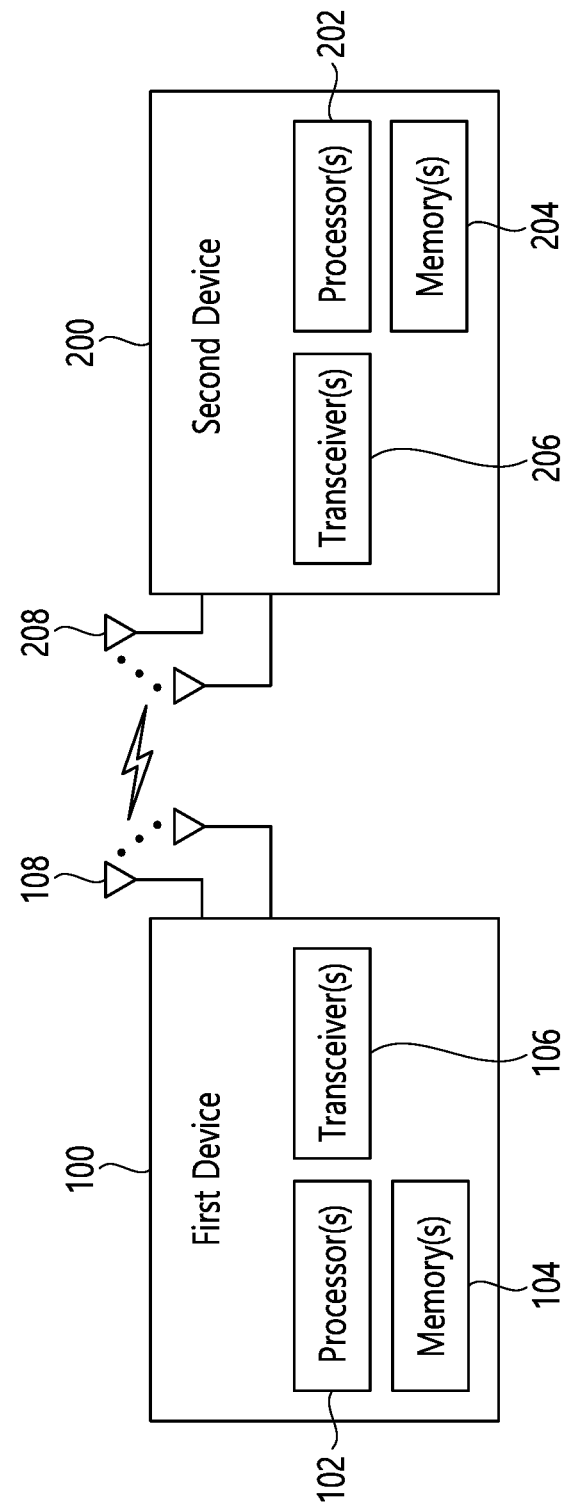
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
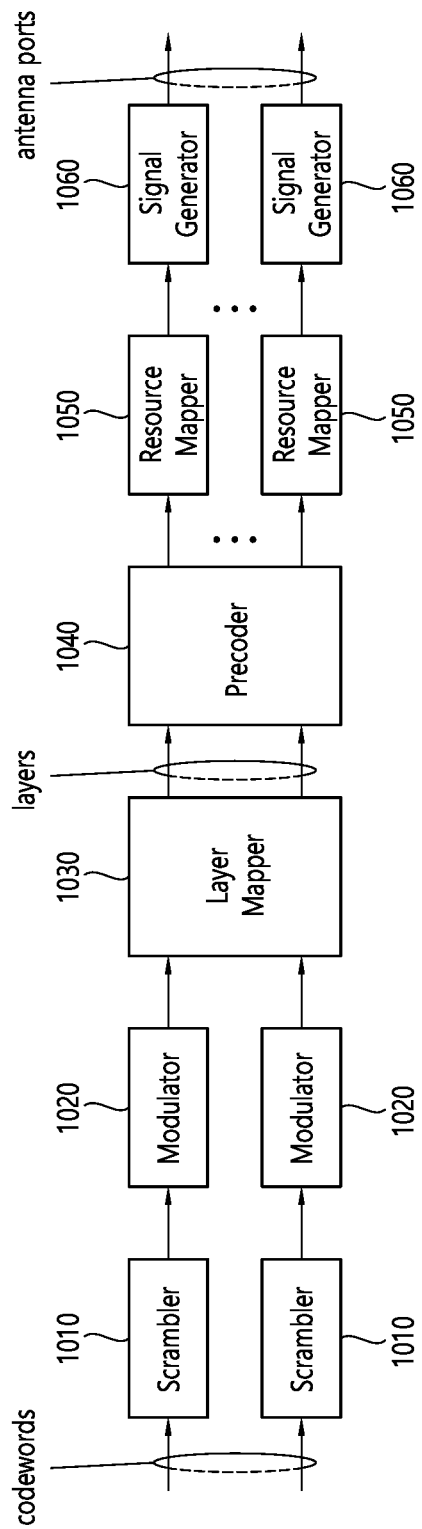
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT)

modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
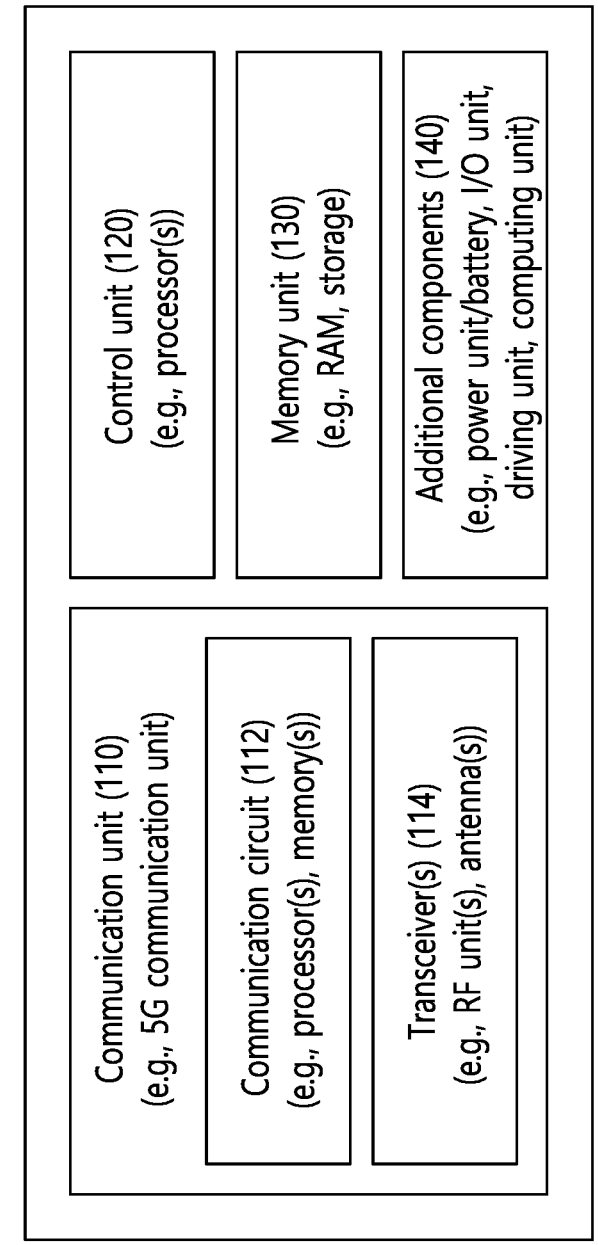
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
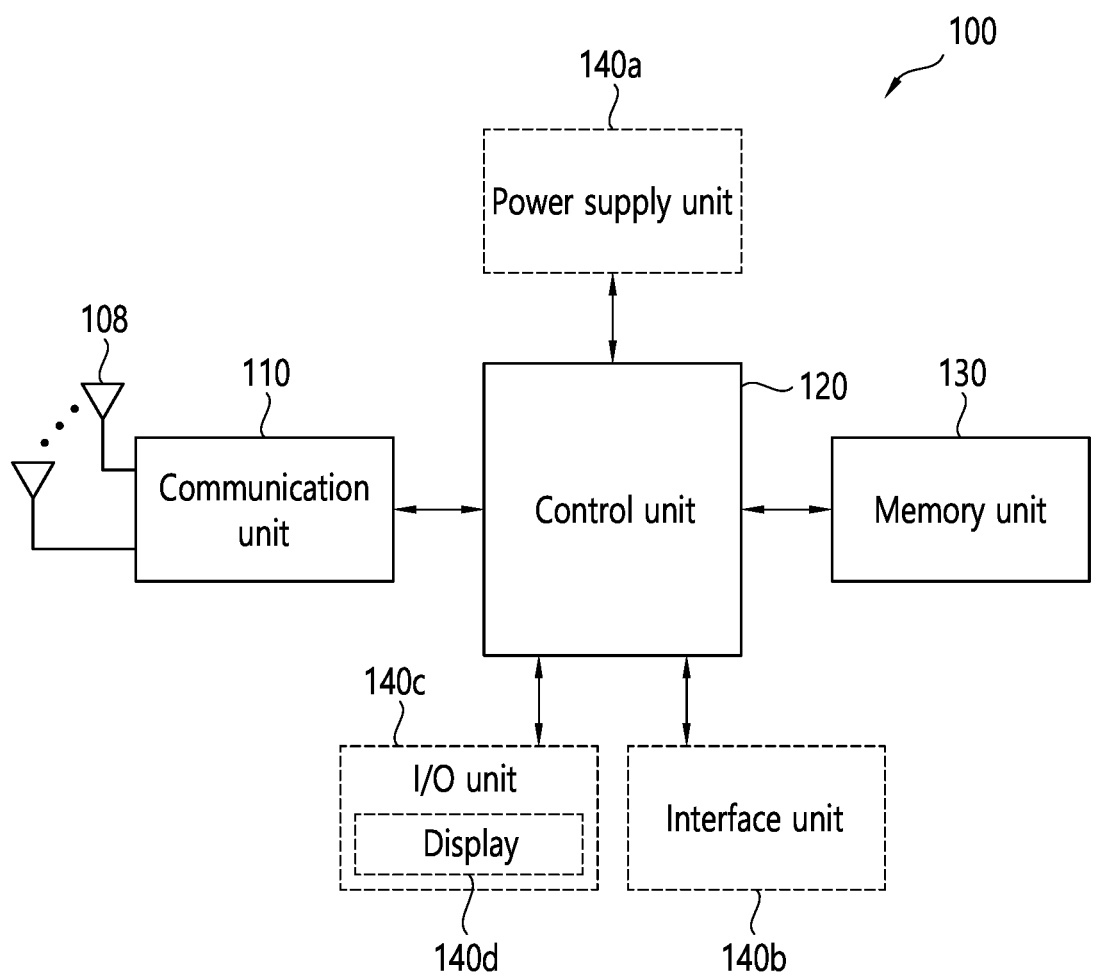
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    receiving a first physical sidelink control channel (PSCCH) or a first physical sidelink shared channel (PSSCH) including information related to a second synchronization source from a second device;
    determining synchronization with the second device based on the information related to the second synchronization source; and
    performing synchronization with the second device based on a reference signal on the first PSCCH or the first PSSCH,
    wherein the second synchronization source includes a synchronization source having a highest priority pre-configured for the second device.

2. The method of claim 1, wherein the information related to the second synchronization source includes information related to whether the second device uses the second synchronization source and information related to a synchronization quality of the second synchronization source for the second device.

3. The method of claim 2,
    wherein the synchronization with the second device is determined based on the second device using the second synchronization source as a synchronization source.

4. The method of claim 1, wherein the
    synchronization with the second device is determined based on the number of times the second device successfully receives a synchronization signal of the second synchronization source is greater than a pre-determined threshold value.

5. The method of claim 1, wherein the
    synchronization with the second device is determined based on that a reception power level of a physical sidelink broadcast channel (PSBCH) reference signal received by the second device from the second synchronization source is higher than a pre-determined threshold level.

6. The method of claim 3, wherein the synchronization with the second device is performed based on that a synchronization source of the highest priority pre-configured for the first device and the second synchronization source are the same.

7. The method of claim 1, further comprising:
    setting at least one of a sidelink synchronization signal (SLSS) ID value or a PSBCH field value related to a state in which the first device is directly synchronized with the second synchronization source.

8. The method of claim 1, wherein the
synchronization with the second device is determined based on determining that a synchronization quality related to the first synchronization source is smaller than a pre-determined threshold value, and
wherein the first synchronization source includes a synchronization source of a highest priority pre-configured for the first device.

9. The method of claim 1, further comprising:
receiving a second PSCCH or a second PSSCH including information related to a third synchronization source from a third device;
determining synchronization with the third device based on the information related to the second synchronization source and the information related to the third synchronization source; and
performing synchronization with the third device based on a reference signal on the second PSCCH or the second PSSCH,
wherein the third synchronization source includes a synchronization source having a highest priority pre-determined for the third device.

10. The method of claim 9, wherein the information related to the third synchronization source includes information related to whether the third device uses the third synchronization source and information related to a synchronization quality of the third synchronization source for the third device.

11. The method of claim 10, wherein the
synchronization with the third device is determined based on the third device using the third synchronization source as a synchronization source.

12. The method of claim 10, wherein the
synchronization with the third device is determined based on that a synchronization quality related to the third synchronization source is better than a synchronization quality related to the second synchronization source.

13. The method of claim 12, wherein
synchronization with the third device is determined based on that a difference value between a reception power level of a demodulation reference signal (DM-RS) on the first PSCCH or first PSSCH and a reception power level of a DM-RS on the second PSCCH or the second PSSCH is smaller than a pre-determined threshold value.

14. A first device for performing wireless communication, the first device comprising:
one or more memories storing instructions;
one or more transceivers; and
one or more processors connected to the one or more memories and the one or more transceivers, wherein the one or more processors execute the instructions to:
receive a first physical sidelink control channel (PSCCH) or a first physical sidelink shared channel (PSSCH) including information related to a second synchronization source from a second device,
determine synchronization with the second device based on the information related to the second synchronization source,
perform synchronization with the second device based on a reference signal on the first PSCCH or the first PSSCH,
wherein the second synchronization source includes a synchronization source having a highest priority pre-configured for the second device.

15. An device configured to control a first user equipment (UE), the device comprising:
one or more processors; and
one or more memories being operably connectable to the one or more processors and storing instructions, wherein the one or more processors execute the instructions to:
receive a first physical sidelink control channel (PSCCH) or a first physical sidelink shared channel (PSSCH) including information related to a second synchronization source from a second UE,
determine synchronization with the second UE based on the information related to the second synchronization source,
perform synchronization with the second UE based on a reference signal on the first PSCCH or the first PSSCH,
wherein the second synchronization source includes a synchronization source having a highest priority pre-configured for the second UE.

* * * * *